United States Patent
Konduri

(10) Patent No.: US 8,966,465 B2
(45) Date of Patent: Feb. 24, 2015

(54) CUSTOMIZATION CREATION AND UPDATE FOR MULTI-LAYER XML CUSTOMIZATION

(75) Inventor: Gangadhar Konduri, Mountain View, CA (US)

(73) Assignee: Oracle International Corporation, Redwood Shores, CA (US)

(*) Notice: Subject to any disclaimer, the term of this patent is extended or adjusted under 35 U.S.C. 154(b) by 1259 days.

(21) Appl. No.: 12/029,615

(22) Filed: Feb. 12, 2008

(65) Prior Publication Data

US 2009/0204943 A1 Aug. 13, 2009

(51) Int. Cl.
 *G06F 9/44* (2006.01)
 *G06F 17/24* (2006.01)
 *G06F 9/45* (2006.01)

(52) U.S. Cl.
 CPC ... *G06F 8/71* (2013.01); *G06F 8/51* (2013.01)
 USPC ............ 717/168; 717/110; 715/255; 715/762

(58) Field of Classification Search
 None
 See application file for complete search history.

(56) References Cited

U.S. PATENT DOCUMENTS

| | | | |
|---|---|---|---|
| 4,595,981 A | 6/1986 | Leung | |
| 5,659,754 A | 8/1997 | Grove et al. | |
| 5,790,778 A | 8/1998 | Bush et al. | |
| 5,850,518 A | 12/1998 | Northrup | |
| 5,946,492 A | 8/1999 | Bates | |
| 6,047,332 A * | 4/2000 | Viswanathan et al. | 709/245 |
| 6,078,745 A | 6/2000 | De Greef et al. | |
| 6,117,180 A | 9/2000 | Dave et al. | |
| 6,138,270 A | 10/2000 | Hsu | |
| 6,154,877 A | 11/2000 | Ramkumar et al. | |
| 6,161,219 A | 12/2000 | Ramkumar et al. | |
| 6,397,254 B1 | 5/2002 | Northrup | |
| 6,401,134 B1 | 6/2002 | Razavi et al. | |
| 6,421,705 B1 | 7/2002 | Northrup | |
| 6,442,751 B1 | 8/2002 | Cocchi et al. | |
| 6,487,713 B1 | 11/2002 | Cohen et al. | |
| 6,546,413 B1 | 4/2003 | Northrup | |
| 6,601,233 B1 | 7/2003 | Underwood | |
| 6,641,746 B2 | 11/2003 | Houge et al. | |
| 6,671,713 B2 | 12/2003 | Northrup | |

(Continued)

OTHER PUBLICATIONS

Claypool, K., et al., "Optimizing Performance of Schema Evolution Sequences", Objects and Databases [online], 2000 [retrieved Jul. 2, 2012], Retrieved from Internet: <http://se-pubs.dbs.uni-leipzig.de/files/Claypool2000OptimizingPerformanceofSchemaEvolutionSequences.pdf>, pp. 114-127.*

(Continued)

*Primary Examiner* — Don Wong
*Assistant Examiner* — Todd Aguilera
(74) *Attorney, Agent, or Firm* — Kilpatrick Townsend & Stockton LLP

(57) ABSTRACT

Embodiments of the present invention provide techniques for customizing aspects of a metadata-driven software application. In particular, embodiments of the present invention provide (1) a self-contained metadata engine for generating customized metadata documents from base metadata documents and customizations; (2) a customization syntax for defining customizations; (3) a customization creation/update component for creating and updating customizations; (4) a customization restriction mechanism for restricting the creation of new customizations by specific users or groups of users; and (5) memory and caching optimizations for optimizing the storage and lookup of customized metadata documents.

19 Claims, 15 Drawing Sheets

(56) References Cited

U.S. PATENT DOCUMENTS

| | | |
|---|---|---|
| 6,671,746 B1 | 12/2003 | Northrup |
| 6,779,000 B1 | 8/2004 | Northrup |
| 6,807,636 B2 | 10/2004 | Hartman et al. |
| 6,901,580 B2 | 5/2005 | Iwanojko et al. |
| 6,922,675 B1 | 7/2005 | Chatterjee et al. |
| 6,922,705 B1 | 7/2005 | Northrup |
| 6,947,992 B1 | 9/2005 | Shachor |
| 6,954,792 B2 | 10/2005 | Kang et al. |
| 6,973,460 B1 | 12/2005 | Mitra |
| 6,990,532 B2 | 1/2006 | Day et al. |
| 7,028,019 B2 | 4/2006 | McMillan et al. |
| 7,062,749 B2 | 6/2006 | Cyr et al. |
| 7,086,009 B2 | 8/2006 | Resnick et al. |
| 7,117,216 B2 | 10/2006 | Chakraborty et al. |
| 7,146,607 B2 | 12/2006 | Nair et al. |
| 7,177,878 B2 | 2/2007 | Wason |
| 7,188,158 B1 | 3/2007 | Stanton et al. |
| 7,203,938 B2 | 4/2007 | Ambrose et al. |
| 7,263,686 B2 | 8/2007 | Sadiq |
| 7,343,360 B1 | 3/2008 | Ristanovic et al. |
| 7,349,913 B2 | 3/2008 | Clark et al. |
| 7,505,990 B2 | 3/2009 | Krishna et al. |
| 7,535,927 B1 | 5/2009 | Northrup |
| 7,536,606 B2 | 5/2009 | Andrews et al. |
| 7,555,712 B2 * | 6/2009 | Croft et al. .................. 715/247 |
| 7,584,207 B2 | 9/2009 | Mortensen et al. |
| 7,590,644 B2 | 9/2009 | Matsakis et al. |
| 7,603,674 B2 | 10/2009 | Cyr et al. |
| 7,644,262 B1 | 1/2010 | Bromley et al. |
| 7,680,752 B1 | 3/2010 | Clune, III et al. |
| 7,685,604 B2 | 3/2010 | Baartman et al. |
| 7,693,851 B2 | 4/2010 | Becker |
| 7,721,158 B2 | 5/2010 | Lee |
| 7,774,477 B2 | 8/2010 | Zintel et al. |
| 7,783,782 B2 | 8/2010 | Cromp et al. |
| 7,788,338 B2 | 8/2010 | Savchenko et al. |
| 7,793,340 B2 | 9/2010 | Kiester et al. |
| 7,827,494 B1 | 11/2010 | Hedayatpour et al. |
| 7,840,941 B2 | 11/2010 | Brookins et al. |
| 7,853,899 B1 | 12/2010 | Damaschke et al. |
| 7,865,544 B2 | 1/2011 | Kordun et al. |
| 7,895,512 B2 * | 2/2011 | Roberts .................. 715/229 |
| 7,933,946 B2 | 4/2011 | Livshits et al. |
| 7,945,907 B2 | 5/2011 | Dreiling et al. |
| 7,950,424 B2 | 5/2011 | Ozanne et al. |
| 7,954,111 B2 | 5/2011 | Waguet |
| 7,984,424 B2 * | 7/2011 | Dengler et al. .................. 717/120 |
| 7,992,130 B2 | 8/2011 | Bozza et al. |
| 8,015,545 B2 | 9/2011 | Seto et al. |
| 8,032,390 B2 | 10/2011 | Waguet |
| 8,065,668 B2 | 11/2011 | Bosworth et al. |
| 8,074,214 B2 | 12/2011 | Isaacson et al. |
| 8,108,825 B2 | 1/2012 | Goodwin et al. |
| 8,122,292 B2 | 2/2012 | Nanjundaswamy |
| 8,141,064 B2 | 3/2012 | Chipman |
| 8,166,450 B2 | 4/2012 | Fuhler et al. |
| 8,196,125 B2 | 6/2012 | Maes |
| 8,209,672 B2 | 6/2012 | Ivanov |
| 8,209,675 B2 | 6/2012 | Zhao et al. |
| 8,271,609 B2 | 9/2012 | Addala et al. |
| 8,332,654 B2 | 12/2012 | Anbuselvan |
| 8,423,973 B2 | 4/2013 | Saunders et al. |
| 8,494,832 B2 | 7/2013 | Krishnan et al. |
| 8,538,998 B2 | 9/2013 | Barrow |
| 8,555,266 B2 | 10/2013 | Copeland et al. |
| 8,560,938 B2 | 10/2013 | Barrow et al. |
| 8,601,454 B2 | 12/2013 | Christophe |
| 8,667,031 B2 | 3/2014 | Konduri et al. |
| 8,782,604 B2 | 7/2014 | Konduri et al. |
| 8,788,542 B2 | 7/2014 | Barrow |
| 8,799,319 B2 | 8/2014 | Srinivasan et al. |
| 8,856,737 B2 | 10/2014 | Kand et al. |
| 8,869,108 B2 | 10/2014 | Utschig-Utschig et al. |
| 8,875,306 B2 | 10/2014 | Lowes |
| 2002/0013938 A1 | 1/2002 | Duesterwald et al. |
| 2002/0023140 A1 | 2/2002 | Hile et al. |
| 2002/0103660 A1 | 8/2002 | Cramon et al. |
| 2002/0129060 A1 | 9/2002 | Rollins et al. |
| 2002/0133515 A1 * | 9/2002 | Kagle et al. .................. 707/511 |
| 2002/0143735 A1 | 10/2002 | Ayi et al. |
| 2002/0147757 A1 | 10/2002 | Day et al. |
| 2002/0188613 A1 | 12/2002 | Chakraborty et al. |
| 2003/0005117 A1 | 1/2003 | Kang et al. |
| 2003/0023587 A1 | 1/2003 | Dennis et al. |
| 2003/0025732 A1 * | 2/2003 | Prichard .................. 345/765 |
| 2003/0033310 A1 | 2/2003 | Factor et al. |
| 2003/0034989 A1 * | 2/2003 | Kondo .................. 345/630 |
| 2003/0074653 A1 | 4/2003 | Ju et al. |
| 2003/0084424 A1 | 5/2003 | Reddy et al. |
| 2003/0088857 A1 | 5/2003 | Salva et al. |
| 2003/0172127 A1 | 9/2003 | Northrup |
| 2003/0172168 A1 | 9/2003 | Mak et al. |
| 2003/0172193 A1 | 9/2003 | Olsen |
| 2003/0192031 A1 | 10/2003 | Srinivasan et al. |
| 2003/0204518 A1 | 10/2003 | Lang et al. |
| 2003/0204645 A1 | 10/2003 | Sharma et al. |
| 2003/0233631 A1 | 12/2003 | Curry et al. |
| 2003/0233642 A1 | 12/2003 | Hank |
| 2004/0046787 A1 | 3/2004 | Henry et al. |
| 2004/0046789 A1 | 3/2004 | Inanoria |
| 2004/0054991 A1 | 3/2004 | Harres |
| 2004/0073565 A1 | 4/2004 | Kaufman et al. |
| 2004/0078424 A1 | 4/2004 | Yairi et al. |
| 2004/0111533 A1 | 6/2004 | Beisiegel et al. |
| 2004/0111673 A1 | 6/2004 | Bowman et al. |
| 2004/0148588 A1 | 7/2004 | Sadiq |
| 2004/0181534 A1 | 9/2004 | Mortensen et al. |
| 2004/0194016 A1 | 9/2004 | Liggitt |
| 2004/0205117 A1 | 10/2004 | Hertling et al. |
| 2004/0205765 A1 | 10/2004 | Beringer et al. |
| 2004/0216094 A1 | 10/2004 | Bosworth et al. |
| 2004/0230639 A1 | 11/2004 | Soluk et al. |
| 2004/0261066 A1 | 12/2004 | Ringseth et al. |
| 2005/0044197 A1 | 2/2005 | Lai |
| 2005/0050527 A1 | 3/2005 | McCrady et al. |
| 2005/0091639 A1 | 4/2005 | Patel |
| 2005/0097503 A1 | 5/2005 | Zintel et al. |
| 2005/0183074 A1 | 8/2005 | Alexander et al. |
| 2005/0193061 A1 | 9/2005 | Schmidt et al. |
| 2005/0223361 A1 | 10/2005 | Belbute |
| 2005/0240858 A1 * | 10/2005 | Croft et al. .................. 715/500 |
| 2005/0251788 A1 | 11/2005 | Henke et al. |
| 2005/0273772 A1 | 12/2005 | Matsakis et al. |
| 2006/0010163 A1 | 1/2006 | Herzog et al. |
| 2006/0015847 A1 | 1/2006 | Carroll, Jr. |
| 2006/0031264 A1 | 2/2006 | Bosworth et al. |
| 2006/0031750 A1 | 2/2006 | Waldorf et al. |
| 2006/0036463 A1 | 2/2006 | Patrick et al. |
| 2006/0075387 A1 | 4/2006 | Martin et al. |
| 2006/0080117 A1 | 4/2006 | Carr et al. |
| 2006/0101038 A1 | 5/2006 | Gabriel et al. |
| 2006/0106626 A1 | 5/2006 | Jeng et al. |
| 2006/0117073 A1 | 6/2006 | Bosworth et al. |
| 2006/0130047 A1 * | 6/2006 | Burugapalli .................. 717/170 |
| 2006/0136832 A1 | 6/2006 | Keller et al. |
| 2006/0143229 A1 | 6/2006 | Bou-Ghannam et al. |
| 2006/0150156 A1 | 7/2006 | Cyr et al. |
| 2006/0165105 A1 | 7/2006 | Shenfield et al. |
| 2006/0168132 A1 | 7/2006 | Bunter et al. |
| 2006/0168355 A1 | 7/2006 | Shenfield et al. |
| 2006/0168557 A1 | 7/2006 | Agrawal et al. |
| 2006/0184866 A1 | 8/2006 | Rees |
| 2006/0206858 A1 | 9/2006 | Becker et al. |
| 2006/0235733 A1 | 10/2006 | Marks |
| 2006/0235986 A1 | 10/2006 | Kim |
| 2006/0242636 A1 | 10/2006 | Chilimbi et al. |
| 2006/0253490 A1 | 11/2006 | Krishna et al. |
| 2006/0265702 A1 | 11/2006 | Isaacson et al. |
| 2006/0271537 A1 | 11/2006 | Chandrasekharan et al. |
| 2006/0277542 A1 | 12/2006 | Wipfel |
| 2006/0282767 A1 | 12/2006 | Suryanarayana et al. |
| 2006/0294474 A1 | 12/2006 | Taylor et al. |
| 2006/0294506 A1 * | 12/2006 | Dengler et al. .................. 717/131 |
| 2007/0016429 A1 | 1/2007 | Bournas et al. |

(56) References Cited

U.S. PATENT DOCUMENTS

| | | |
|---|---|---|
| 2007/0055936 A1 | 3/2007 | Dhanjal et al. |
| 2007/0106975 A1 | 5/2007 | Deline |
| 2007/0113191 A1 | 5/2007 | Keller et al. |
| 2007/0130205 A1 | 6/2007 | Dengler et al. |
| 2007/0157078 A1 | 7/2007 | Anderson |
| 2007/0169199 A1 | 7/2007 | Quinnell et al. |
| 2007/0174763 A1 | 7/2007 | Chang et al. |
| 2007/0174822 A1 | 7/2007 | Moser et al. |
| 2007/0203956 A1* | 8/2007 | Anderson et al. ............ 707/203 |
| 2007/0220429 A1 | 9/2007 | Kureshy et al. |
| 2007/0240096 A1 | 10/2007 | Pontoppidan et al. |
| 2007/0245340 A1 | 10/2007 | Cohen et al. |
| 2007/0260575 A1 | 11/2007 | Robinson et al. |
| 2007/0266377 A1 | 11/2007 | Ivanov |
| 2007/0271552 A1 | 11/2007 | Pulley |
| 2007/0277095 A1* | 11/2007 | Ukigawa ..................... 715/513 |
| 2007/0282885 A1 | 12/2007 | Baude et al. |
| 2007/0294586 A1 | 12/2007 | Parvathy et al. |
| 2007/0294664 A1 | 12/2007 | Joshi |
| 2008/0004887 A1 | 1/2008 | Brunswig et al. |
| 2008/0022257 A1 | 1/2008 | Baartman et al. |
| 2008/0028302 A1* | 1/2008 | Meschkat ..................... 715/255 |
| 2008/0065675 A1 | 3/2008 | Bozich et al. |
| 2008/0077848 A1* | 3/2008 | Roberts ........................ 715/229 |
| 2008/0083012 A1 | 4/2008 | Yu et al. |
| 2008/0104617 A1 | 5/2008 | Apacible et al. |
| 2008/0120557 A1 | 5/2008 | Offenhartz et al. |
| 2008/0126396 A1 | 5/2008 | Gagnon |
| 2008/0127087 A1 | 5/2008 | Brookins et al. |
| 2008/0127124 A1 | 5/2008 | Gilfix et al. |
| 2008/0162208 A1 | 7/2008 | Waguet |
| 2008/0162304 A1 | 7/2008 | Ourega |
| 2008/0162565 A1 | 7/2008 | Waguet |
| 2008/0163164 A1 | 7/2008 | Chowdhary et al. |
| 2008/0183479 A1 | 7/2008 | Iwashita et al. |
| 2008/0183744 A1 | 7/2008 | Adendorff et al. |
| 2008/0184201 A1 | 7/2008 | Burns et al. |
| 2008/0189358 A1 | 8/2008 | Charles |
| 2008/0189617 A1 | 8/2008 | Covell et al. |
| 2008/0196024 A1 | 8/2008 | Barfield et al. |
| 2008/0243901 A1 | 10/2008 | Super et al. |
| 2008/0250313 A1 | 10/2008 | Kamdar et al. |
| 2008/0275844 A1 | 11/2008 | Buzsaki et al. |
| 2008/0276218 A1 | 11/2008 | Taylor et al. |
| 2008/0276260 A1 | 11/2008 | Garlick et al. |
| 2008/0295109 A1 | 11/2008 | Huang et al. |
| 2008/0313648 A1 | 12/2008 | Wang et al. |
| 2008/0320246 A1 | 12/2008 | Fuhler et al. |
| 2009/0031280 A1 | 1/2009 | Koehler |
| 2009/0083297 A1 | 3/2009 | Pohl et al. |
| 2009/0089741 A1 | 4/2009 | Bornhoevd et al. |
| 2009/0094588 A1 | 4/2009 | Chipman |
| 2009/0106494 A1 | 4/2009 | Knebel |
| 2009/0125893 A1 | 5/2009 | Copeland et al. |
| 2009/0144716 A1 | 6/2009 | Felts |
| 2009/0144729 A1 | 6/2009 | Guizar |
| 2009/0150565 A1 | 6/2009 | Grossner et al. |
| 2009/0157859 A1 | 6/2009 | Morris |
| 2009/0158237 A1 | 6/2009 | Zhang et al. |
| 2009/0158263 A1 | 6/2009 | Christophe |
| 2009/0178020 A1 | 7/2009 | Goodwin et al. |
| 2009/0204567 A1 | 8/2009 | Barrow |
| 2009/0204629 A1 | 8/2009 | Barrow |
| 2009/0204884 A1 | 8/2009 | Barrow et al. |
| 2009/0205013 A1 | 8/2009 | Lowes |
| 2009/0217153 A1* | 8/2009 | Oshima et al. ................ 715/234 |
| 2009/0259993 A1 | 10/2009 | Konduri et al. |
| 2009/0292797 A1 | 11/2009 | Cromp et al. |
| 2009/0313256 A1 | 12/2009 | Konduri et al. |
| 2009/0320007 A1 | 12/2009 | Krishnaswamy et al. |
| 2010/0057482 A1 | 3/2010 | Radhakrishnan et al. |
| 2010/0057836 A1 | 3/2010 | Anbulselvan |
| 2010/0070553 A1 | 3/2010 | Addala et al. |
| 2010/0070973 A1 | 3/2010 | Addala et al. |
| 2010/0082556 A1 | 4/2010 | Srinivasan et al. |
| 2010/0131937 A1 | 5/2010 | Misra et al. |
| 2010/0132009 A1 | 5/2010 | Khemani et al. |
| 2010/0146291 A1 | 6/2010 | Anbuselvan |
| 2010/0162220 A1 | 6/2010 | Cui et al. |
| 2010/0236660 A1 | 9/2010 | Ozanne et al. |
| 2010/0313038 A1 | 12/2010 | Bradley |
| 2010/0332401 A1 | 12/2010 | Prahlad et al. |
| 2010/0332454 A1 | 12/2010 | Prahlad et al. |
| 2010/0333116 A1 | 12/2010 | Prahlad et al. |
| 2011/0010692 A1 | 1/2011 | Hattori et al. |
| 2011/0023071 A1 | 1/2011 | Li et al. |
| 2011/0047415 A1 | 2/2011 | Nanjundaswamy |
| 2011/0119649 A1 | 5/2011 | Kand et al. |
| 2011/0119651 A1 | 5/2011 | Utschig-Utschig et al. |
| 2011/0282829 A1 | 11/2011 | Rangaswamy et al. |
| 2012/0116980 A1 | 5/2012 | Mercuri |
| 2012/0296624 A1 | 11/2012 | Jeng et al. |
| 2013/0024424 A1 | 1/2013 | Prahlad et al. |
| 2013/0086568 A1 | 4/2013 | Krishnamurthy |
| 2014/0081896 A1 | 3/2014 | Ranganathan et al. |
| 2014/0282602 A1 | 9/2014 | Addala et al. |
| 2014/0310686 A1 | 10/2014 | Srinivasan et al. |

OTHER PUBLICATIONS

Nagappan, R., et al., "XML Processing and Data Binding with Java APIs" in: Developing Java Web Services: Architecting and Developing Secure Web Sservices Using Java [online], 2003 [retrieved Jul. 2, 2012], Retrieved from Internet: <http://java.sun.com/developer/Books/j2ee/devjws/>, pp. 313-399.*

Steinberg, D., "Data Binding with JAXB" [online], 2003, retrieved [Jul. 2, 2012], Retrieved from Internet: <https://www6.software.ibm.com/developerworks/education/x-jaxb/x-jaxb-a4.pdf>, pp. 1-34.*

U.S. Appl. No. 12/790,437, filed May 28, 2010, Utschig-Utschig et al.

U.S. Appl. No. 12/791,445, filed May 28, 2010, Kand et al.

Beisiegel, et al., "SCA Service Component Architecture—Assembly Model Specification," Mar. 15, 2007, SCA version 1.00, 91 pages, BEA Systems, Inc.

"Business Process Language (BPEL) and Oracle BPEL Process Manager," Oracle FAQ, updated Jun. 26, 2004, printed on Nov. 11, 2009, at URL: http://www.oracle.com/technology/products/ias/bpel/htdocs/orabpel_faq.html?_template= . . . , 3 pages.

Chappell, "Introducing SCA," David Chappell & Associates, Jul. 2007, pp. 1-22.

Chapman, et al., "SCA Service Component Architecture—Client and Implementation Model Specification for WS-BPEL," Mar. 21, 2007, SCA version 1.00, 15 pages, BEA Systems, Inc.

CipherSoft Inc, "Exodus-Main Features Benefits" Products, at URL: http://www.ciphersoftinc.com/products/expdus-features-benefits.html; printed on Aug. 28, 2009; 3 pages.

CipherSoft Inc, "Exodus™ Products," printed on Aug. 28, 2009, at URL: http://www.ciphersoftinc.com/products/migration-products-overview.html; 3 pages.

"Client-Server Modernization—From Oracle® Forms to Java," VGO Software Products, printed on Aug. 28, 2009, at URL: http://www.vgosoftware.com/products/evo/index.php; 2 pages.

"Oracle Forms to Java Modernization" printed on Aug. 28, 2009, at URL: http://www.vgosoftware.com/products/evo/walkthrough.php; VGO Software Information printed 5 pages.

Shepherd, et al., "Oracle SCA—The Power of the Composite," An Oracle White Paper, Aug. 2009, pp. 1-19, Oracle.

"Vgo Software First to Convert Oracle Forms to Oracle ADF V11"; VGO News, printed on Aug. 28, 2009; at URL: http://www.vgosoftware.com/about/news/view_article.php?new_id=35; 2 pages.

Final Office Action for U.S. Appl. No. 12/029,605, mailed on Sep. 28, 2010, 15 pages.

Final Office Action for U.S. Appl. No. 12/029,609, mailed on Oct. 13, 2010, 14 pages.

Non-Final Office Action for U.S. Appl. No. 12/203,816, mailed on Sep. 2, 2010, 18 pages.

Hildebrandt, G., "Web-based Document Management", Apr. 2001, 22 pages.

(56) References Cited

OTHER PUBLICATIONS

Shang-Pin Ma, "Discovery-Based Service Composition," National Central University, Doctoral Dissertation. Jan. 2007, 109 pages.
Yang et al., "Web Component: A Substrate for Web Service Reuse and Composition". Proc. 14th Conf. Advanced Information Systems Eng. (CAiSE 02), LNCS 2348, Springer-Verlag, 2002, 16 pages.
Non-Final Office Action for U.S. Appl. No. 12/029,605, mailed on Jul. 20, 2011, 12 pages.
Non-Final Office Action for U.S. Appl. No. 12/101,420, mailed on Oct. 5, 2011, 18 pages.
Final Office Action for U.S. Appl. No. 12/029,600, mailed on Oct. 19, 2011, 20 pages.
Final Office Action for U.S. Appl. No. 12/029,605, mailed on Nov. 2, 2011, 13 pages.
Final Office Action for U.S. Appl. No. 12/029,609, mailed on Nov. 8, 2011, 13 pages.
Final Office Action for U.S. Appl. No. 12/138,997, mailed on Dec. 5, 2011, 13 pages.
Non-Final Office Action for U.S. Appl. No. 12/487,004, mailed on Sep. 28, 2011, 29 pages.
"Dynamic Structure in ADF UIX Pages," from *Oracle ADF UIX Developer's Guide*, pp. 1-11 downloaded from http://www.oracle.com/webapps/online-help/jdeveloper/10.1.2/state/content/navId.4/navSetId.\_/vtAnchor.DeltaTree/vtTopicFile.uixhelp%7Cuixdevguide%7Cdynamic%7Ehtml/ on Apr. 21, 2008.
Non-Final Office Action for U.S. Appl. No. 12/138,997, mailed on Jun. 24, 2011, 19 pages.
Zhang, et al., "Schema Based XML Security: RBAC Approach," Machine Simulator, Third International Conference on Computer Assisted Learning, Published 2003, at URL: http://citeseerx.ist.psu.edu/viewdoc/summary?doi=10.1.1.3.6016, pp. 1-15.
Non-Final Office Action for U.S. Appl. No. 12/029,724, mailed on Dec. 14, 2010, 43 pages.
Smith, Portals: Toward an Application Framework for Interoperability,: Communications of the ACM, Oct. 2004, vol. 47, No. 10, pp. 93-97.
Phanouriou, "UIML: A Device-Independent User Interface Markup Language," Doctoral Dissertation, Virginia Polytechnic Institute and State University, Sep. 26, 2000, 172 pages.
"File and Registry Virtualization—the good, the bad, and the ugly," Jerry's Incoherent Babbling; Windows Connected Blog; Published Dec. 19, 2005; at URL: http://windowsconnected.com/blogs/jerry/archive/2005/12/19/file-and-registry-virtualization-the-good-the-bad-and-t . . . ; 6 pages.
Non-Final Office Action for U.S. Appl. No. 12/029,600, mailed on Apr. 27, 2011, 216 pages.
Final Office Action for U.S. Appl. No. 12/029,724, mailed on May 5, 2011, 27 pages.
Final Office Action for U.S. Appl. No. 12/203,816, mailed on Jan. 20, 2011, 26 pages.
Non-Final Office Action for U.S. Appl. No. 12/029,605 mailed on May 12, 2010; 13 pages.
Non-Final Office Action for U.S. Appl. No. 12/029,609 mailed on May 26, 2010; 17 pages.
"AJAX & Security: Vulnerability in DWR Security Logic Identified Can Potentially be exploited to launce DoS attacks and break into back-end servers", published Jan. 8, 2007, AjaxWorld™ Magazine, pp. 1-4 downloaded on Oct. 6, 2008 from http://ajax.sys-con.com/node/319868, 4 pages.
"Direct Web Remoting, About DWR's Javascript Security", 4 pages downloaded from http://directwebremoting.org/dwr/security/script-tag-protection on Oct. 6, 2008.
"Direct Web Remoting, DWR version 2—New and Noteworthy", 4 pages downloaded from http://directwebremoting.org/dwr/changelog/dwr20 on Dec. 5, 2008.
"Direct Web Remoting, DWR: Easy AJAX for JAVA", 2 pages downloaded from http://directwebremoting.org/dwr/overview/dwr on Oct. 6, 2008.
"Direct Web Remoting, Safari, GET and Request Forgery", 1 page downloaded from http://directwebremoting.org/dwr/security/allowGetForSafariButMakeForgeryEasier on Oct. 6, 2008.
"Direct Web Remoting, Security", 4 pages downloaded from http://directwebremoting.org/dwr/security on Oct. 6, 2008.
"Google Web Toolkit, Product Overview", 3 pages downloaded from http://code.google.com/webtoolkit/overview.html on Oct. 6, 2008.
"Oracle Application Framework", Oracle, Dec. 2006, pp. 1-242, 242 pages.
Altenhofen et al., "ASMs in Service Oriented Architectures", Journal of Universal Computer Science, vol. 14, No. 12, 2008, 25 pages.
Box et al., "Web Services Addressing (WS-Addressing)" Aug. 10, 2004, 23 pages, http://www.w3.org/Submission/ws-addressing/#\_Toc77464317, printed on Aug. 18, 2009, 23 pages.
Carey, "Making BPEL Processes Dynamic" Oracle Technology Network, 8 pages, printed on Aug. 18, 2009, 8 pages.
Curphey et al., "Web Application Security Assessment Tools", IEEE, 2006, pp. 32-41, 10 pages.
Dipaola et al., "Subverting Ajax", Dec. 2006, 23rd CCC Conference, pp. 1-8, 8 pages.
Hohpe et al., "Messaging Systems" Enterprise Integration Patterns 2004, pp. 57-97, Chapter 3, Pearson Education, Inc, Boston, Massachusetts, 45 pages.
Non-Final Office Action for U.S. Appl. No. 12/210,657 mailed on Apr. 25, 2011, 21 pages.
Non-Final Office Action for U.S. Appl. No. 12/210,657 mailed on Sep. 30, 2011, 21 pages.
Non-Final Office Action for U.S. Appl. No. 12/212,599 mailed on Dec. 22, 2011, 10 pages.
Non-Final Office Action for U.S. Appl. No. 12/330,008 mailed on Dec. 21, 2011, 14 pages.
Final Office Action for U.S. Appl. No. 12/101,420 mailed on Feb. 24, 2012, 20 pages.
Final Office Action for U.S. Appl. No. 12/487,004 mailed on Mar. 19, 2012, 30 pages.
Final Office Action for U.S. Appl. No. 12/210,657 mailed on Apr. 3, 2012, 23 pages.
Final Office Action for U.S. Appl. No. 12/330,008 mailed on Apr. 10, 2012, 13 pages.
U.S. Appl. No. 13/360,127, filed Jan. 27, 2012 by Krishnamurthy et al.
Mietzner, et al., "Defining Composite Configurable SaaS Application Packages Using SCA Variability Descriptors and Multi-Tenancy Patters,", 2008, pp. 156-161.
"Phillips, Josh. Window's Connected UseriD: Jerry. Jerry's Incoherent Babbling: ""File and Registry Virtualization—the good, the bad, and the ugly"". <http:/ /wi ndowsco n nected. co m/b logs/jerry/archive/2005/ 12/1 9/fi l e-and-reg istry-vi rtual izatio n-th e-good-th ebad-and-th-ugly.aspx>. Published: Dec. 19, 2005."
Non-Final Office Action for U.S. Appl. No. 12/203,816 mailed on Oct. 26, 2012 30 pages.
Non-Final Office Action for U.S. Appl. No. 12/029,724 mailed on Jan. 7, 2013, 39 pages.
Final Office Action for U.S. Appl. No. 12/029,724 mailed on Apr. 30, 2013, 33 pages.
Terminal Disclaimer—Approved for U.S. Appl. No. 12/029,600 mailed on Oct. 25, 2011, 1 page.
Non-Final Office Action for U.S. Appl. No. 12/029,600 mailed on Sep. 17, 2012, 38 pages.
Notice of Allowance for U.S. Appl. No. 12/029,600 mailed on Nov. 7, 2012, 16 pages.
Notice of Allowance for U.S. Appl. No. 12/029,600 mailed on Feb. 5, 2013, 16 pages.
Non-Final Office Action for U.S. Appl. No. 12/029,605 mailed on Apr. 10, 2013, 38 pages.
Non-Final Office Action for U.S. Appl. No. 12/029,609 mailed on Jul. 28, 2011, 29 pages.
Notice of Allowance for U.S. Appl. No. 12/029,609 mailed on Feb. 4, 2013, 52 pages.
Non-Final Office Action for U.S. Appl. No. 12/212,599 mailed on Aug. 2, 2012, 18 pages.
Advisory Action for U.S. Appl. No. 12/487,004 mailed on May 24, 2012, 5 pages.

(56) References Cited

OTHER PUBLICATIONS

Notice of Allowance for U.S. Appl. No. 12/330,008 mailed on Aug. 7, 2012, 17 pages.
Non-Final Office Action for U.S. Appl. No. 12/790,437 mailed on Jan. 30, 2013, 31 pages.
Non-Final Office Action for U.S. Appl. No. 12/790,445 mailed on Dec. 19, 2012, 30 pages.
U.S. Appl. No. 12/029,605, Final Office Action mailed on Sep. 6, 2013, 19 pages.
U.S. Appl. No. 12/029,605, Advisory Action mailed on Dec. 18, 2013, 4 pages.
U.S. Appl. No. 12/101,420, Notice of Allowance mailed on Aug. 28, 2013, 9 pages.
U.S. Appl. No. 12/138,997, Notice of Allowance mailed on Nov. 27, 2013, 13 pages.
U.S. Appl. No. 12/203,816, Advisory Action mailed on Aug. 15, 2013, 3 pages.
U.S. Appl. No. 12/212,599, Corrected Notice of Allowance mailed on Oct. 2, 2013, 4 pages.
U.S. Appl. No. 12/487,004, Non Final Office Action mailed on Sep. 24, 2013, 22 pages.
Cetin et al., A mashup-based strategy for migration to service-oriented computing, IEEE International Conference on Pervasive Services, IEEE, Jul. 20, 2007.
Li et al., Leveraging legacy codes to distributed problem-solving environments: a Web services approach, Software:Practice and experience, vol. 34, No. 13, 2004, pp. 1297-1309.
Li et al., SGrid: a service-oriented model for the Semantic Grid, Future Generation Computer Systems, vol. 20, No. 1, 2004, pp. 7-18.
Sneed et al., Integrating legacy software into a service oriented architecture, Software Maintenance and Reengineering, CSMR, IEEE, 2006.
Notice of Allowance for U.S. Appl. No. 12/210,657 mailed on Jun. 26, 2012, 6 pages.
Notice of Allowance for U.S. Appl. No. 12/330,008 mailed on Jun. 11, 2012, 7 pages.
Claessens, J., et al., "A Tangled World Web of Security Issues." First Monday vol. 7, No. 3-4, (Mar. 2002): 24 pages. Web. Jun. 25, 2013.
Final Office Action for U.S. Appl. No. 12/203,816 mailed on Jul. 5, 2013, 25 pages.
Notice of Allowance for U.S. Appl. No. 12/029,600 mailed on Jun. 11, 2013, 10 pages.
Notice of Allowance for U.S. Appl. No. 12/029,609 mailed on May 29, 2013, 14 pages.
Notice of Allowance for U.S. Appl. No. 12/212,599 mailed on Jun. 19, 2013, 6 pages.
Final Office Action for U.S. Appl. No. 12/790,437 mailed on Jul. 12, 2013, 12 pages.
Final Office Action for U.S. Appl. No. 12/790,445 mailed on Jul. 5, 2013, 10 pages.
U.S. Appl. No. 13/360,127, Non-Final Office Action mailed on Apr. 22, 2014, 16 pages.
U.S. Appl. No. 12/790,437, Notice of Allowance mailed on Jun. 12, 2014, 5 pages.
U.S. Appl. No. 12/790,445, Notice of Allowance mailed on Jun. 4, 2014, 5 pages.
Chappell et al., Ready for Primetime: The Next-Generation, Grid-Enabled Service-Oriented Architecture, SOA—The SOA Magazine, Sep. 3, 2007, pp. 1-10.
U.S. Appl. No. 12/212,599, Notice of Allowance mailed on Feb. 7, 2014, 5 pages.
U.S. Appl. No. 12/487,004, Final Office Action mailed on Dec. 27, 2013, 7 pages.
U.S. Appl. No. 12/487,004, Notice of Allowance mailed on Mar. 6, 2014, 18 pages.
U.S. Appl. No. 12/790,437, Non-Final Office Action mailed on Dec. 30, 2013, 15 pages.
U.S. Appl. No. 12/790,445, Non-Final Office Action mailed on Dec. 31, 2013, 13 pages.
U.S. Appl. No. 12/029,605, Notice of Allowance mailed on Mar. 3, 2014, 9 pages.
U.S. Appl. No. 12/101,420, Notice of Allowance mailed on Mar. 17, 2014, 8 pages.
Chen et. al., Feature Analysis for Service-Oriented Reengineering, IEEE 12th Asia-Pacific Software Engineering Conference (APSEC 2005), Dec. 2005, Taipei, Taiwan.
U.S. Appl. No. 12/029,724, Notice of Allowance mailed on Jun. 24, 2014, 13 pages.
Oracle BPEL 10g Purging Strategies, An Oracle White Paper, Oracle, Aug. 2010, 21 pages.
Oracle SOA Suite 11 g: Essential Concepts, vol. I—Student Guide, Edition 1.0, Oracle, Sep. 2010, pp. 8-18, 8-20 and 8-21.
Bohn et al., WS-BPEL Process Compiler for Resource-Constrained Embedded Systems, 22nd International Conference on Advanced Information Networking and Applications, IEEE, 2008, pp. 1387-1392.
Vesperman, Essential CVS, O'Reilly Media Inc., Jun. 9, 2003.
U.S. Appl. No. 12/029,605, Notice of Allowability mailed on May 28, 2014, 2 pages.
U.S. Appl. No. 12/029,724, Advisory Action mailed on Aug. 12, 2013, 2 pages.
U.S. Appl. No. 12/212,599, Corrected Notice of Allowability mailed on Sep. 25, 2014, 3 pages.
U.S. Appl. No. 12/212,599, Notice of Allowance mailed on Jul. 15, 2014, 5 pages.
U.S. Appl. No. 12/487,004, Notice of Allowability mailed on Jun. 16, 2014, 2 pages.
U.S. Appl. No. 12/790,437, Supplemental Notice of Allowability mailed on Aug. 13, 2014, 2 pages.
U.S. Appl. No. 13/360,127, Notice of Allowance mailed on Nov. 4, 2014, 10 pages.

* cited by examiner

CUSTOMIZATION CREATION AND UPDATE FOR MULTI-LAYER XML CUSTOMIZATION

CROSS-REFERENCES TO RELATED APPLICATIONS

The present application incorporates by reference for all purposes the entire contents of:

(1) U.S. Non-Provisional application Ser. No. 12/029,600 titled MULTI-LAYER XML CUSTOMIZATION filed concurrently with the present application;

(2) U.S. Non-Provisional application Ser. No. 12/029,605 titled CUSTOMIZATION SYNTAX FOR MULTI-LAYER XML CUSTOMIZATION filed concurrently with the present application;

(3) U.S. Non-Provisional application Ser. No. 12/029,724 titled CUSTOMIZATION RESTRICTIONS FOR MULTI-LAYER XML CUSTOMIZATION filed concurrently with the present application; and (4) U.S. Non-Provisional application Ser. No. 12/029,609 titled CACHING AND MEMORY OPTIMIZATIONS FOR MULTI-LAYER XML CUSTOMIZATION filed concurrently with the present application.

BACKGROUND OF THE INVENTION

Embodiments of the present invention relate to computer software, and more particularly relate to techniques for customizing aspects of a metadata-driven software application.

Software applications are often customized to meet the needs of specific customers. This is particularly true in the field of enterprise software, where each organization may have a unique set of business requirements and data integration needs. Customizations generally fall into one of several categories, including site customizations (i.e., customizations that apply to all users of a deployment), group customizations (i.e., customizations that apply to specific groups or categories of users), and user customizations (i.e., customizations that apply to a single user).

In recent years, an increasing number of enterprise applications are being built using a metadata-driven approach. These applications (referred to herein as metadata-driven applications) are structured such that aspects of their content, behavior, and/or appearance are specified via metadata rather than program code. Generally speaking, the customization of metadata-driven applications amounts to customizing their corresponding metadata.

According to one known approach for customizing a metadata-driven application, a customer may make direct modifications to the application's base metadata and thereby tailor the application to its needs. However, this technique is problematic for several reasons. For example, if an upgrade or patch modifying the base metadata is released, the customer must expend considerable time and effort in re-implementing and retesting the modifications against the new version of the metadata. This process must be repeated for each new release. Further, this approach cannot be used to implement conditional customizations (i.e., customizations that apply to specific users or groups of users), which generally require modifications to the application code.

According to another known approach, the application developer may implement predefined customizations directly in the application metadata/code. However, this greatly increases the complexity of the application, resulting in higher development and maintenance costs. In addition, since the number of predefined customizations is necessarily limited, this approach cannot address the diverse customization requirements of all customers. Although the application developer may implement a mechanism for allowing customers to create their own customizations, this further increases application complexity and cost.

BRIEF SUMMARY OF THE INVENTION

Embodiments of the present invention address the foregoing and other such problems by providing techniques for customizing aspects of a metadata-driven software application. In particular, embodiments of the present invention provide (1) a self-contained metadata engine for generating customized metadata documents from base metadata documents and customizations; (2) a customization syntax for defining customizations; (3) a customization creation/update component for creating and updating customizations; (4) a customization restriction mechanism for restricting the creation of new customizations by specific users or groups of users; and (5) memory and caching optimizations for optimizing the storage and lookup of customized metadata documents.

According to one embodiment of the present invention, a method for customizing a software application comprises receiving a base metadata document defining one or more characteristics of at least a portion of the software application, and identifying one or more customizations defining modifications to the base metadata document. A customized metadata document is then generated based on the one or more customizations and the base metadata document.

In one embodiment, the one or more customizations are stored separately from the base metadata document. For example, the one or more customizations may be stored in a predefined location relative to the base metadata document. Thus, the base metadata document may be upgraded without affecting the one or more customizations. Further, embodiments of the present invention may support an arbitrary number of customizations per base metadata document.

In another embodiment, the steps of receiving the base metadata document, identifying the one or more customizations, and generating the customized metadata document are performed by a metadata engine at runtime of the software application. The metadata engine may be a generic component configured to interoperate with any software application or system software component that makes use of metadata.

In another embodiment, the step of identifying the one or more customizations comprises determining one or more customizations levels, and for each customization level, identifying a customization based on one or more runtime attributes of the software application. The one or more customization levels are configurable by users of the software application. Further, the one or more customization levels may be sorted in a precedence order, where the customized metadata document is generated by applying the one or more customizations to the base metadata document in the precedence order. In one embodiment, the one or more customization levels are stored in an XML-based configuration file.

In another embodiment, the one or more customizations may be created by a supplier/developer of the software application, and packaged as part as of the software application. The one or more customizations may also be created by a user of the software application. In one embodiment, a customization creation interface is provided for creating a customization at any customization level.

In another embodiment, the customized metadata document generated from the one or more customizations and the base metadata document may be used to generate a user interface of the software application.

According to another embodiment of the present invention, a system for customizing software applications is provided. The system comprises a repository configured to store a base metadata document and one or more customizations, where the base metadata document defines one or more characteristics of at least a portion of the software application, and where the one or more customizations define modifications to the base metadata document. The one or more customizations are stored separately from the base metadata document. The system further comprises a metadata engine configured to receive the base metadata document, identify the one or more customizations, and generate a customized metadata document based on the one or more customizations and the base metadata document.

According to yet another embodiment of the present invention, a machine-readable medium is disclosed, the machine-readable medium having stored thereon a series of instructions which, when executed by a processing component, cause the processing component to customize a software application. In various embodiments, the series of instructions cause the processing component to receive a base metadata document defining one or more characteristics of at least a portion of the software application, and identify one or more customizations defining modifications to the base metadata document. The one or more customizations are stored separately from the base metadata document. The series of instructions further cause the processing component to generate a customized metadata document based on the one or more customizations and the base metadata document.

According to one embodiment of the present invention, a syntax for customizing a metadata document defining one or more characteristics of at least a portion of a software application is disclosed. The syntax comprises at least one element used to define a modification to a source element of the metadata document, where the at least one element includes a required attribute that must be set to a value that uniquely identifies the source element. The value may be a unique identifier associated with the source element. Alternatively, if there is no unique identifier, the value may be an XPath expression that selects the source element. In various embodiments, the syntax is expressed as an XML schema.

In one embodiment, the at least one element may include a modify element used to modify an attribute of the source element, a move element used to reorder or re-parent the source element, and/or a replace element used to replace or remove the source element. The syntax may further include a second element used to insert a new element into the metadata document.

According to another embodiment of the present invention, a customization for a metadata document is provided. The customization includes at least one element that corresponds to a modification of a source element of the metadata document, where the at least one element includes an attribute that is set to a value that uniquely identifies the source element. In various embodiments, the customization is an XML document.

According to one embodiment of the present invention, a method for restricting the customizability of a base metadata document comprises receiving a type-level customization policy defined for an object type of an object included in the base metadata document, the type-level customization policy indicating whether the object type may be customized by users of a software application. The type-level customization policy is then enforced at runtime of the software application. This enforcement may include determining a policy value from a session context of the software application, the policy value indicating a username, group, or role of a current user of the software application, and determining, based on the policy value, the type-level customization policy, and the set of default behavior rules, whether an instance of the object included in the base metadata object may be customized by the current user. In various embodiments, the type-level customization policy is implemented as one or more type annotations to the object type.

In one embodiment, the method above further includes receiving an instance-level customization policy defined for the object included in the base metadata document, the instance-level customization policy indicating whether an instance of the object may be customized by users of the software application, and enforcing the instance-level customization policy at runtime of the software application. This enforcement may include determining, based on the previously determined policy value, the type-level customization policy, the instance-level customization policy, a set of precedence rules, and a set of default behavior rules, whether the instance of the object may be customized by the current user. In one embodiment, the instance-level customization policy is implemented as one or more object annotations in the base metadata document.

If there is a conflict between the type-level customization policy and the instance-level customization policy, the set of precedence rules indicates which policy overrides the other. Further, if no customization policy is defined, the set of default behavior rules indicate whether the instance of the object may be customized by users of the software application.

According to another embodiment of the present invention, a system for restricting the customizability of a base metadata document defining one or more characteristics of at least a portion of the software application is provided. The system comprises a declarative syntax for defining a customization policy, the customization policy indicating whether an instance of an object included in the base metadata object may be customized by users of the software application, and an evaluation engine configured to enforce the customization policy at runtime of the software application. In various embodiments, the system may further comprise a design tool for viewing/editing the customization policy, and an application programming interface (API) for programmatically determining whether the instance of the object is customizable for a given user of the software application.

According to yet another embodiment of the present invention, a machine-readable medium is disclosed, the machine-readable medium having stored thereon a series of instructions which, when executed by a processing component, cause the processing component to restrict the customizability of a base metadata document defining one or more characteristics of a software application. In various embodiments, the series of instructions cause the processing component to receive a type-level customization policy defined for an object type of an object included in the base metadata document, the type-level customization policy indicating whether instances of objects having the object type may be customized by users of the software application, and enforcing the type-level customization policy at runtime of the software application.

According to one embodiment of the present invention, a method for caching customized metadata documents for a metadata-driven software application comprises receiving a request for a customized version of a base metadata document, where the base metadata document defines one or more characteristics of at least a portion of the software application, and where the base metadata document is to be customized for a first user among a plurality of users of the software application. The method further comprises identifying a first customization for the base metadata document, where the first customization is determined to be applicable to the plurality of users; identifying a second customization for the base metadata document, where the second customization is determined to be applicable only to the first user; generating a first customized metadata document based on the first customization and the base metadata document; and generating a second customized metadata document based on the first customized metadata document and the second customization. The first customized metadata document is then stored in a shared cache applicable to application sessions of the plurality of users, and the second customized metadata document is stored in a session cache applicable only to an application session of the first user. In various embodiments, the second customized metadata document is returned to the requestor.

In one embodiment, the method above further comprises receiving another request for another customized version of the base metadata document, where the base metadata document is to be customized for a second user among the plurality of users; identifying a third customization for the base metadata document, where the third customization is determined to be applicable only to the second user; retrieving the first customized metadata document from the shared cache; and generating a third customized metadata document based on the retrieved first customized metadata document and the third customization. The third customized metadata document is then stored in another session cache applicable only to an application session of the second user. In various embodiments, the third customized metadata document is returned to the requestor.

In another embodiment, the first customized metadata document includes a first element and a second element, and the second customized metadata document includes the first element and a modified version of the second element. Further, storing the first customized metadata document in the shared cache comprises storing the first customized metadata document in a working memory as a first tree memory structure, the first tree memory structure including an allocated memory segment for the first element and an allocated memory segment for the second element, and storing the second customized metadata document in the session cache comprises storing the second customized metadata document in the working memory as a second tree memory structure, the second tree memory structure including a pointer to the allocated memory segment for the first element in the first tree memory structure and an allocated memory segment for the modified version of the second element.

According to another embodiment of the present invention, a layered cache for caching customized metadata documents for a metadata-driven software application is disclosed. The layered cache comprises a shared cache configured to store data for application sessions for a plurality of users of the software application, where the data includes a first set of customized metadata documents, each customized metadata document in the first set being based on one or more customizations applicable to the plurality of users. The layered cache further comprises a plurality of session caches, each session cache configured to store data for an application session of a single user, where the data stored in said each session cache includes a second set of customized metadata documents, each customized metadata document in the second set based on one or more customizations applicable only to the single user. In various embodiments, the layered cache is utilized by a metadata engine for efficiently providing customized application metadata to one or more components of the software application.

According to another embodiment of the present invention, a system for caching customized metadata documents for a metadata-driven software application is provided. The system comprises a working memory component including a shared cache configured to store data for application sessions of a plurality of users of the software application, and a session cache configured to store data only for an application session of a first user in the plurality of users. The system further includes a processing component configured to receive a request for a customized version of a base metadata document, where the base metadata document defines one or more characteristics of at least a portion of the software application, and where the base metadata document is to be customized for the first user; identify a first customization for the base metadata document, where the first customization is determined to be applicable to the plurality of users; identify a second customization for the base metadata document, where the second customization is determined to be applicable only to the first user; generate a first customized metadata document based on the first customization and the base metadata document; and generate a second customized metadata document based on the first customized metadata document and the second customization. The processing component is further configured to store the first customized metadata document in the shared cache, and store the second customized metadata document in the session cache. In various embodiments, the second customized metadata document is returned to the requester.

According to yet another embodiment of the present invention, a machine-readable medium is disclosed, the machine-readable medium having stored thereon a series of instructions which, when executed by a processing component, cause the processing component to cache customized metadata documents for a metadata-driven software application. In various embodiments, the series of instructions cause the processing component to receive a request for a customized version of a base metadata document, where the base metadata document defines one or more characteristics of at least a portion of the software application, and where the base metadata document is to be customized for a first user among a plurality of users of the software application; identify a first customization for the base metadata document, where the first customization is determined to be applicable to the plurality of users; identify a second customization for the base metadata document, where the second customization is determined to be applicable only to the first user; generate a first customized metadata document based on the first customization and the base metadata document; and generate a second customized metadata document based on the first customized metadata document and the second customization. The series of instructions further cause the processing component to store the first customized metadata document in a shared cache applicable to application sessions of the plurality of users, and store the second customized metadata document in a session cache applicable only to an application session of the first user. In various embodiments, the second customized metadata document is returned to the requestor.

A further understanding of the nature and advantages of the embodiments disclosed herein may be realized by reference to the remaining portions of the specification and the attached drawings.

BRIEF DESCRIPTION OF THE DRAWINGS

Various embodiments in accordance with the present invention will be described with reference to the drawings, in which.

In the drawings, the use of like reference numbers in different drawings indicates similar components.

DETAILED DESCRIPTION OF THE INVENTION

Figure 1:
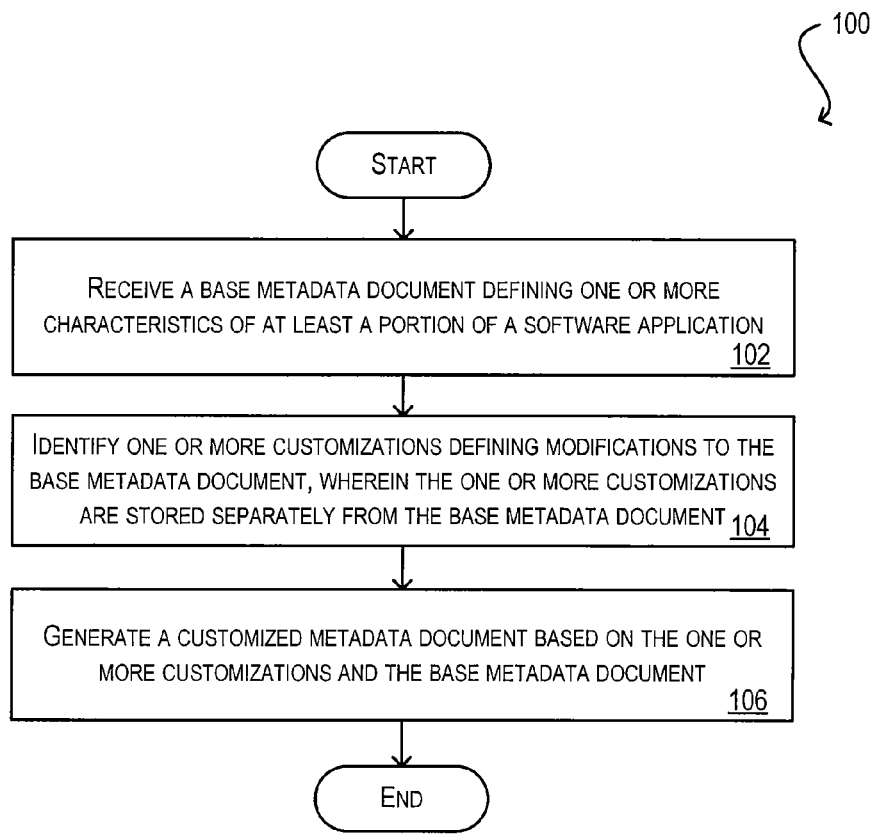
FIG. 1 is a flowchart illustrating the steps performed in customizing a base metadata document of a software application in accordance with an embodiment of the present invention.

In the following description, for the purposes of explanation, numerous specific details are set forth in order to provide an understanding of the present invention. It will be apparent, however, to one skilled in the art that the present invention may be practiced without some of these specific details. In other instances, well-known structures and devices are shown in block diagram form.

Embodiments of the present invention provide a framework for customizing metadata-driven software applications. According to one set of embodiments, the framework includes a metadata engine configured to receive a base metadata document and identify one or more sets of modifications (referred to herein as customizations) for the document based on one or more criteria. The metadata engine is further configured to generate a customized metadata document from the base metadata document and the one or more customizations, and present the customized metadata document to an application for processing. In one embodiment, the customizations are stored separately from the base metadata document. This allows the base metadata document to be modified (e.g., via an application patch/upgrade) without affecting the customizations. In another embodiment, the customization capability described above is completely contained within the metadata engine. Accordingly, any application or system software component driven by metadata may use the metadata engine to support customization with minimal changes.

In various embodiments, the framework further includes a customization syntax, a customization restriction mechanism, and a plurality of memory and caching optimizations. The customization syntax is a proprietary syntax that allows for efficient representation of modifications (e.g., modify, move, replace, insert, etc.) to a base metadata document. In one embodiment, the customization syntax is expressed as an Extensible Markup Language (XML) schema.

The customization restriction mechanism provides a technique for controlling whether certain elements of a base metadata documents may be customized, and by whom. As described in greater detail below, customization restrictions may be defined at a metadata object type level, a metadata object instance level, or both.

The memory and caching optimizations optimize storage and lookup of customized metadata documents by the metadata engine at application runtime. These optimizations include a layered cache for caching customized variants of metadata documents in a memory area configured to store data for application sessions of all users or groups of users (i.e., a shared cache), or in a memory area configured to store data for the application session of a single user (i.e., a session cache). These optimizations further include a specialized, hierarchical memory structure for efficiently storing representations of customized metadata documents in working memory.

As used herein, a "base metadata document" is a document that defines one or more base (i.e., non-customized) characteristics of at least a portion of a software application. In various embodiments, these characteristics may correspond to the content, behavior, and/or appearance of the application. For example, a base metadata document "X.xml" may define a page layout for a user interface of an application.

A "customization" is a document that defines one or more modifications to a base metadata document. Thus, a customization "custX.xml" may specify a rearrangement of the page layout defined in base metadata document "X.xml." As described in greater detail below, embodiments of the present invention allow an arbitrary number of customizations to be defined for, and applied to, a given base metadata document.

Embodiments of the present invention may be used in a variety of different domains and contexts. Certain embodiments are particularly applicable to enterprise software applications, which are commonly customized to meet the business requirements of specific customers. However, the customization techniques described herein may be used to provide customization functionality for any system or application framework that relies on metadata.

FIG. 1 is a flowchart 100 illustrating the steps performed in customizing a base metadata document of a software application in accordance with an embodiment of the present invention. In various embodiments, the processing of flowchart 100 may be implemented in software, hardware, or combinations thereof. As software, flowchart 100 may be implemented as part of a metadata engine configured to provide customized metadata to one or more components of the application. An exemplary metadata engine is discussed in greater detail with respect to FIG. 3 below.

At step 102, a base metadata document for the application is received, where the base metadata document defines one or more characteristics of at least a portion of the application. As described previously, these characteristics may correspond to the content, behavior, and/or appearance of the application. In one set of embodiments, the base metadata document is formatted in Extensible Markup Language (XML). However, embodiments of the present invention may be adapted to customize metadata documents formatted in any type of markup language, such as HTML, SGML, and the like.

At step 104, one or more customizations defining modifications to the base metadata document are identified. Like the base metadata document, the one or more customizations may be formatted in XML or any other type of markup language. In an exemplary embodiment, the one or more customizations are identified based on one or more criteria, such as runtime attributes of the application. This identification process is discussed in greater detail with respect to FIG. 2 below.

In one set of embodiments, the one or more customizations are stored separately from the base metadata document. In other words, the one or more customizations and the base metadata document are stored as separate files (in the case of a file-based repository) or in separate database tables or rows (in the case of a DB-based repository). This allows the base metadata document to be modified or upgraded (for example, via an application patch or upgrade) without affecting the customizations. The one or more customizations and the base metadata document may be stored in the same repository (e.g., a centralized metadata repository), or in separate repositories.

In further embodiments, the one or more customizations are stored in a predetermined location relative to the location of the base metadata document. For example, the one or more customizations may be stored in file folder located at a predetermined hierarchical location relative to a file folder containing the base metadata document. In this manner, the location of a base metadata document may be used to easily determine the location of the customizations for the base metadata document. Alternatively, the one or more customizations may be stored in the same location as the base metadata document, or a well-known centralized location common to all base metadata documents. One of ordinary skill in the art would recognize many variations, modifications, and alternatives.

At step 106, a customized metadata document is generated based on the one or more customizations and the base metadata document. If multiple customizations are merged with the base metadata document, the customizations are applied cumulatively. For example, if customization "A.xml" includes a modification to element A and customization "B.xml" includes a modification to element B, the customized metadata document will include the modifications to both elements A and B. In some cases, a modification defined in a first customization may conflict with a modification defined in a second customization. This situation may be resolved by defining a precedence order for customizations, which is discussed in greater detail with respect to FIGS. 4 and 5 below.

In an exemplary embodiment, the processing of flowchart 100 is performed at runtime of the software application. For example, the processing of flowchart 100 may be initiated in response to a request for a user interface of the application. In this case, steps 102, 104, 106 may be executed in real-time (or near real-time). The customized metadata document generated at step 106 may then be used to present a customized version of the requested user interface to the requestor.

It should be appreciated that the specific steps illustrated in FIG. 1 provide a particular method for customizing a base metadata document of a software application according to an embodiment of the present invention. Other sequences of steps may also be performed according to alternative embodiments. For example, while FIG. 1 illustrates that all of the customizations for a base metadata document are identified (step 104) prior to generating a customized metadata document (step 106), other sequences of steps are possible. In one alternative embodiment, each customization may be applied incrementally to the base metadata document as it is identified. Further, the individual steps illustrated in FIG. 1 may include multiple sub-steps that may be performed in various sequences as appropriate to the individual step. Yet further, additional steps may be added or removed depending on the particular applications. One of ordinary skill in the art would recognize many variations, modifications, and alternatives.

Figure 2:
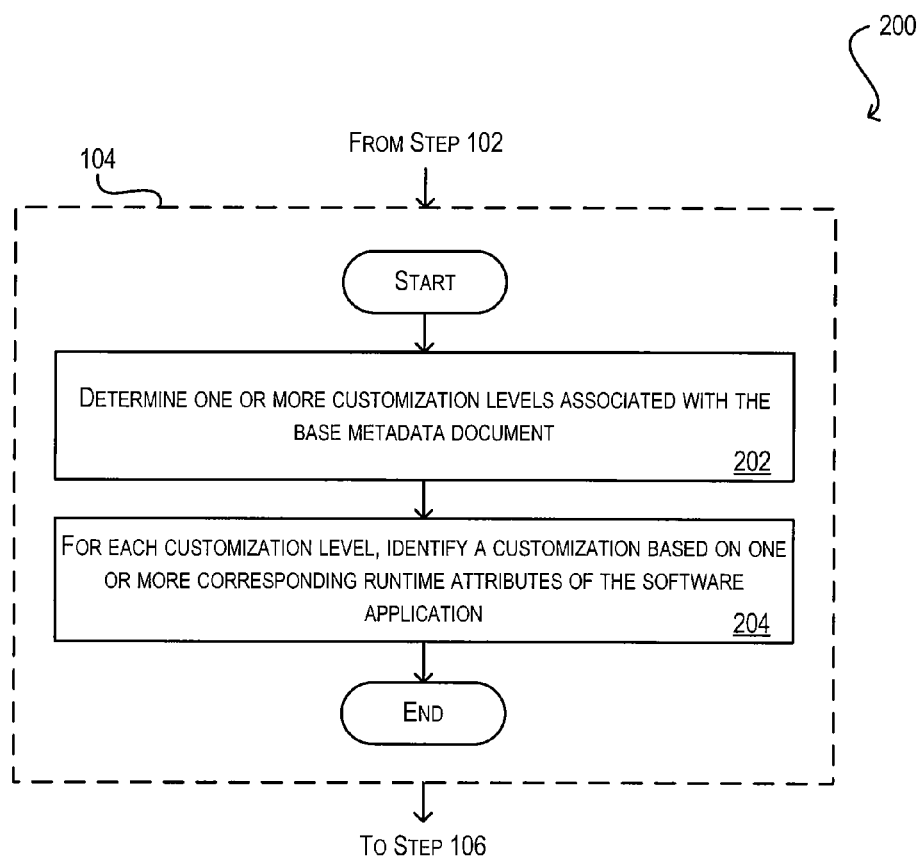
FIG. 2 is flowchart illustrating the steps performed in identifying customizations for a base metadata document in accordance with an embodiment of the present invention.

FIG. 2 is a flowchart 200 illustrating the steps performed in identifying customizations for a base metadata document in accordance with an embodiment of the present invention. Specifically, flowchart 200 corresponds to an exemplary implementation of step 104 of FIG. 1. At step 202, one or more customization levels associated with the base metadata document are determined. In various embodiments, the one or more customization levels correspond to one or more "layers" of customization that may be applied to the base metadata document simultaneously. For example, the one or more customization levels may include user, group, site, vertical market, and the like. In one embodiment, the one or more customization levels are fully configurable by users of the software application. Thus, users may define an arbitrary number of customization levels, and provide a custom label/name for each (e.g., department, organization, job type, etc.). Further, an arbitrary number of distinct customization levels may be associated with a given base metadata document.

Once the customization levels for the base metadata document have been determined, a customization is identified for each customization level based on one or more corresponding runtime attributes of the application (step 204). For example, assume the base metadata document is associated with a user customization level and a group customization level. In this case, a runtime attribute corresponding to the user customization level (e.g., username) will be used to determine an appropriate user-level customization for the base metadata document. Similarly, a runtime attribute corresponding to the group customization level (e.g., group) will be used to determine an appropriate group-level customization for the base metadata document. In this manner, the customizations applied to the base metadata document may change dynamically based on the current runtime context of the application.

In one set of embodiments, the one or more customization levels associated with a base metadata document may be configured by users of the software application. In addition, a precedence order for applying the customizations corresponding to the customization levels may be defined. This functionality is discussed with respect to the customization configuration file of FIG. 4 below.

Figure 3:
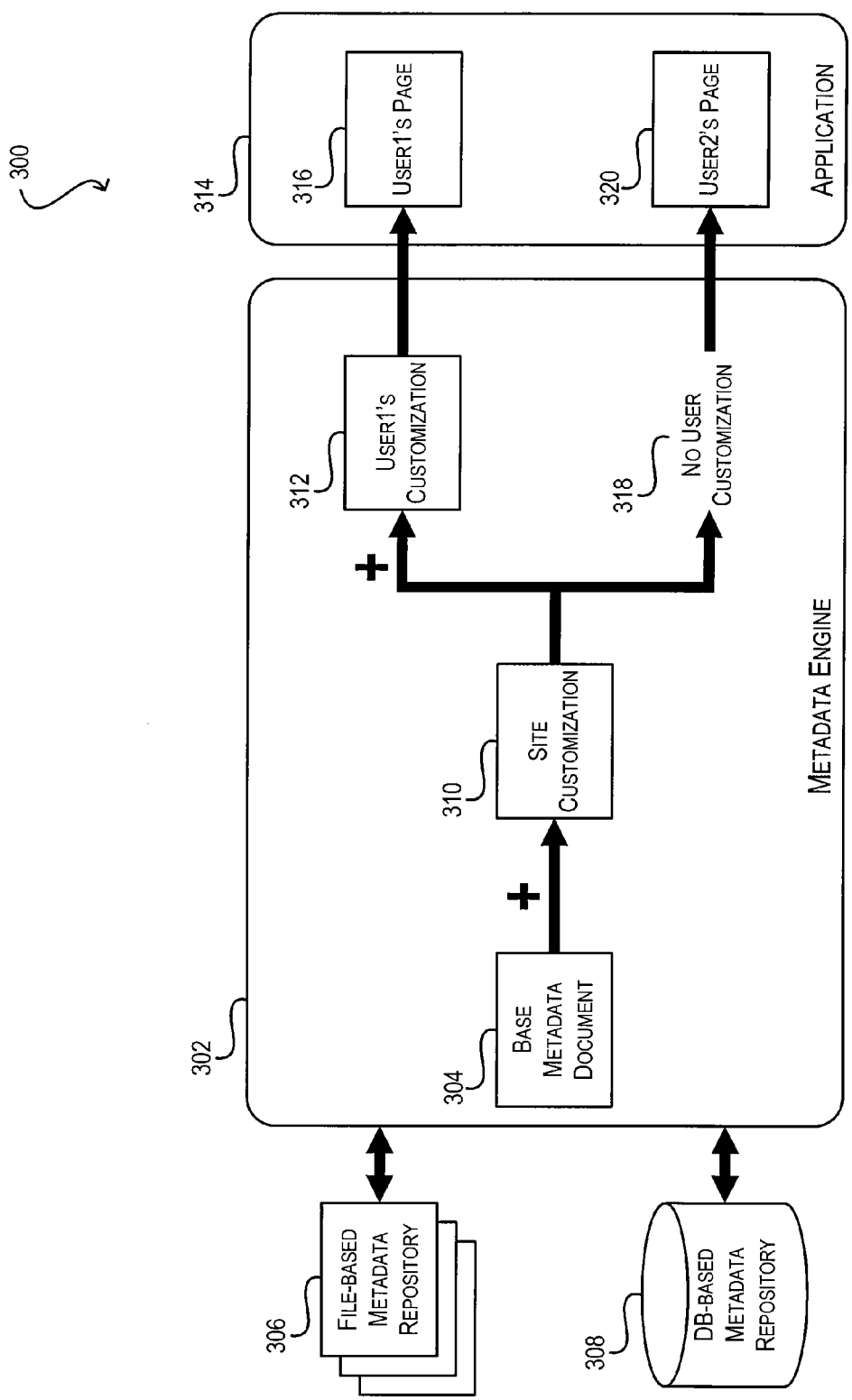
FIG. 3 is a simplified block diagram illustrating a metadata engine in accordance with an embodiment of the present invention.

FIG. 3 is a simplified block diagram 300 illustrating a metadata engine 302 in accordance with an embodiment of the present invention. In various embodiments, metadata engine 302 is configured to customize base metadata documents for a software application as described in flowcharts 100 and 200 of FIGS. 1 and 2. As shown, metadata engine 302 is communicatively coupled with a software application 314, a file-based metadata repository 306, and a database-based metadata repository 308. One or more of repositories 306, 308 is configured to store a base metadata document (e.g., 304) for application 314. Further, one or more of repositories 306, 308 is configured to store customizations (e.g., 310, 312) for the base metadata document.

According to one runtime flow, metadata engine 302 receives base metadata document 304 from repository 306/308, where the base metadata document corresponds to an application page requested by user1 of application 314. Metadata engine 302 then identifies, as per the processing of FIG. 2, one or more customizations applicable to user1. In the example of FIG. 3, a site level customization 310 and a user-level customization 312 are identified. These customizations are applied to base metadata document 304 to generate a customized metadata document. The customized metadata document is passed to application 314, where it used to generate a customized application page 316 for user1.

According to another runtime flow, metadata engine 302 receives base metadata document 304 from repository 306/308, where the base metadata document corresponds to an application page requested by user2 of application 314. Metadata engine 302 then identifies, as per the processing of FIG. 2, one or more customizations applicable to user2. In the example of FIG. 3, only site level customization 310 is identified; in other words, user2 does not have a user-level customization (318). Accordingly, only site-level customization 310 is applied to base metadata document 304 to generate a customized metadata document. The customized metadata document is passed to application 314, where it used to generate a customized application page 320 for user2.

Thus, as shown, metadata engine 302 may dynamically determine the customizations to be applied to a given base metadata document based on runtime attributes (e.g., current user) of application 314. For example, site customization 310 and user customization 312 are applied to base metadata document 304 for user1, while only site customization 310 is applied to base metadata document 304 for user2.

Further, metadata engine 302 may apply multiple customizations to a base metadata document. Although a maximum of two customizations are applied in the example of FIG. 3 (site customization 310 and user1 customization 312), any number of customizations are supported.

Yet further, the steps of customizing base metadata document 304 are completely contained within metadata engine 302. As a result, any software application or software component driven by metadata may use metadata engine 302 to support customization with minimal code changes. For example, application 314 need only be modified to call metadata engine 302 to access base metadata document 304, rather than retrieving the document directly from repository 306 or 308. Metadata engine 302 transparently applies the appropriate customizations and passes the customized version of the base metadata document to the application.

Figure 4:
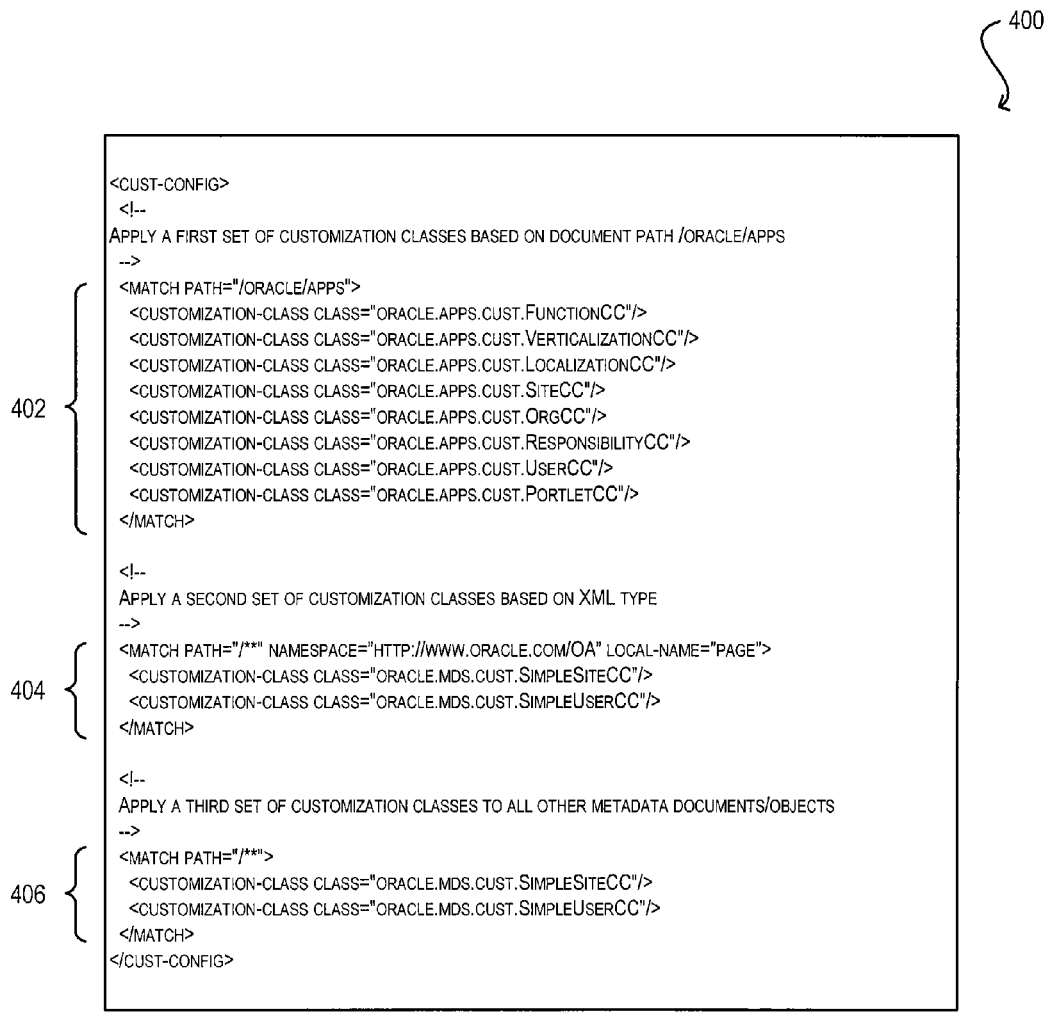
FIG. 4 is a code sample illustrating a customization configuration file in accordance with an embodiment of the present invention.

FIG. 4 is a code sample illustrating a customization configuration file 400 for a software application in accordance with an embodiment of the present invention. As discussed above, each base metadata document of the application may be associated with one or more customizations levels that represent the applicable customization "layers" for the document. This information may be defined declaratively in configuration file 400. In one set of embodiments, configuration file 400 is editable by users of the software application, thereby allowing the users to modify the customization behavior of metadata engine 302 to meet their particular business requirements.

As shown, configuration file 400 includes three "customization class" lists 402, 404, and 406. Generally speaking, a customization class is a function/class corresponding to a particular customization level. For example, customization class "UserCC" is a function/class corresponding to user-level customization, customization class "OrgCC" is a function/class corresponding to organization-level customization, etc. In one set of embodiments, each customization class is configured to evaluate the current runtime context of the application and return a value indicating the appropriate customization for its corresponding customization level based on said runtime context. Thus, if the current user is "user1," the "UserCC" customization class will return a value indicating the user-level customization for "user1." Similarly, if the organization of the current user is "Sales," the "OrgCC" customization class will return a value indicating the organization-level customization for "Sales."

In an exemplary embodiment, a predefined set of customization classes may be implemented and provided by a supplier/developer of the software application. This predefined set may include classes that correspond to commonly used customization levels such as user, group, organization, site, vertical market, and the like. Users of the software application may also implement their own customization classes.

Customization class lists 402, 404, 406 represent three types of mappings between customization classes and base metadata documents. List 402 represents a mapping based on document path. Thus, base metadata documents with the document path of "/ORACLE/APPS" are associated with the enumerated customization classes of list 402. List 404 represents a mapping based on the XML namespace of the top-level element in the metadata document. Thus, base metadata documents having a top-level element with the XML namespace "http://www.oracle.com/OA" are associated with the enumerated customization classes of list 404. List 406 represents a default mapping for all other base metadata documents not mapped in 402 or 404. Thus, all other base metadata documents are associated with the customization classes enumerated in list 406.

In one set of embodiments, the order of customization classes in each list 402, 404, 406 defines a precedence order for applying customizations corresponding to those classes. For example, assume a base metadata document "X.xml" falls within the matching scope of list 404 (i.e., the XML namespace of its top-level element is "http://www.oracle.com/OA"). When X.xml is customized, a customization "SimpleSiteX.xml" corresponding to "SimpleSiteCC" will be applied to X.xml prior to a customization "SimpleUserX.xml" corresponding to "SimpleUserCC."

In a further set of embodiments, the precedence order may be used to resolve conflicts between customizations. For example, in one embodiment, a customization that is higher in the precedence order may override a conflicting customization that is lower in the precedence order. Thus, customization "SimpleSiteX.xml" will override customization "SimpleUserX.xml." In an alternative embodiment, a customization that is lower in the precedence order may override a customization that is higher in the precedence order.

Although only three customization class lists are illustrated in FIG. 4, any number of lists may be supported. In addition, each list may contain an arbitrary number of distinct customization classes. As a result, a given base metadata document may be associated with an arbitrary number of customization levels.

Further, although configuration file 400 is shown as using a specific XML-based syntax for representing lists 402, 404, 406, any other appropriate syntax may be utilized. One of ordinary skill in the art would recognize many variations, modifications, and alternatives.

Figure 5:
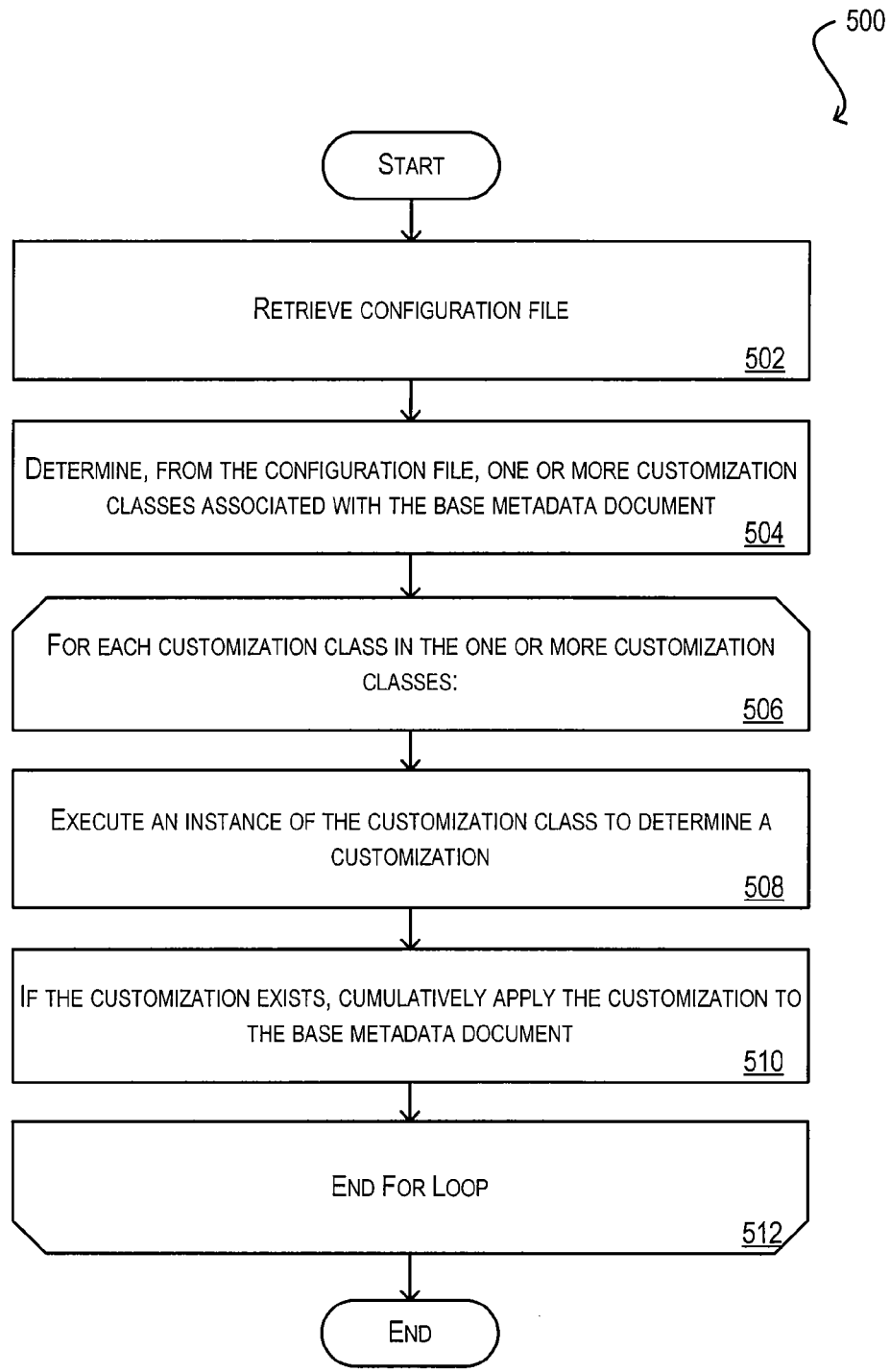
FIG. 5 is a second flowchart illustrating the steps performed in customizing a base metadata document of a software application in accordance with an embodiment of the present invention.

FIG. 5 is a flowchart 500 illustrating the steps performed in customizing a base metadata document using a configuration file such as configuration file 400 of FIG. 4 in accordance with an embodiment of the present invention. In various embodiments, the processing of flowchart 500 may be implemented in software, hardware, or combinations thereof. As software, flowchart 500 may be implemented as part of a metadata engine configured to provide customized metadata to one or more components of the application, such as metadata engine 302 of FIG. 3.

At step 502, the configuration file is retrieved. In one embodiment, the configuration file may be cached in a working memory, such as a working memory of metadata engine 302 or application 314, and retrieved from the cache. In other embodiments, the configuration file may be retrieved from a storage repository.

At step 504, one or more customization classes associated with the base metadata document are determined. In one embodiment, this step comprises determining the appropriate customization class list (e.g., list 402, 404, 406 of FIG. 4) for the base metadata document.

Once the customization classes have been determined, an instance of a first customization class in the one or more customization classes is executed to determine a customization (steps 506, 508). As discussed above, this determination is based one or more runtime attributes of the software application. If the customization returned by the first customization class exists, then the customization is retrieved and cumulatively applied to the base metadata document (step 510). Steps 508 and 510 are iterated until all of the customization classes for the base metadata document have been executed (step 512). In an exemplary embodiment, steps 508 and 510 are iterated over customization classes in the precedence order defined in the configuration file. This ensures that customizations are applied to the base metadata document according to the precedence order.

It should be appreciated that the specific steps illustrated in FIG. 5 provide a particular method for customizing a base metadata document according to an embodiment of the present invention. Other sequences of steps may also be performed according to alternative embodiments. For example, alternative embodiments of the present invention may perform the steps outlined above in a different order. Moreover, the individual steps illustrated in FIG. 5 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 6:
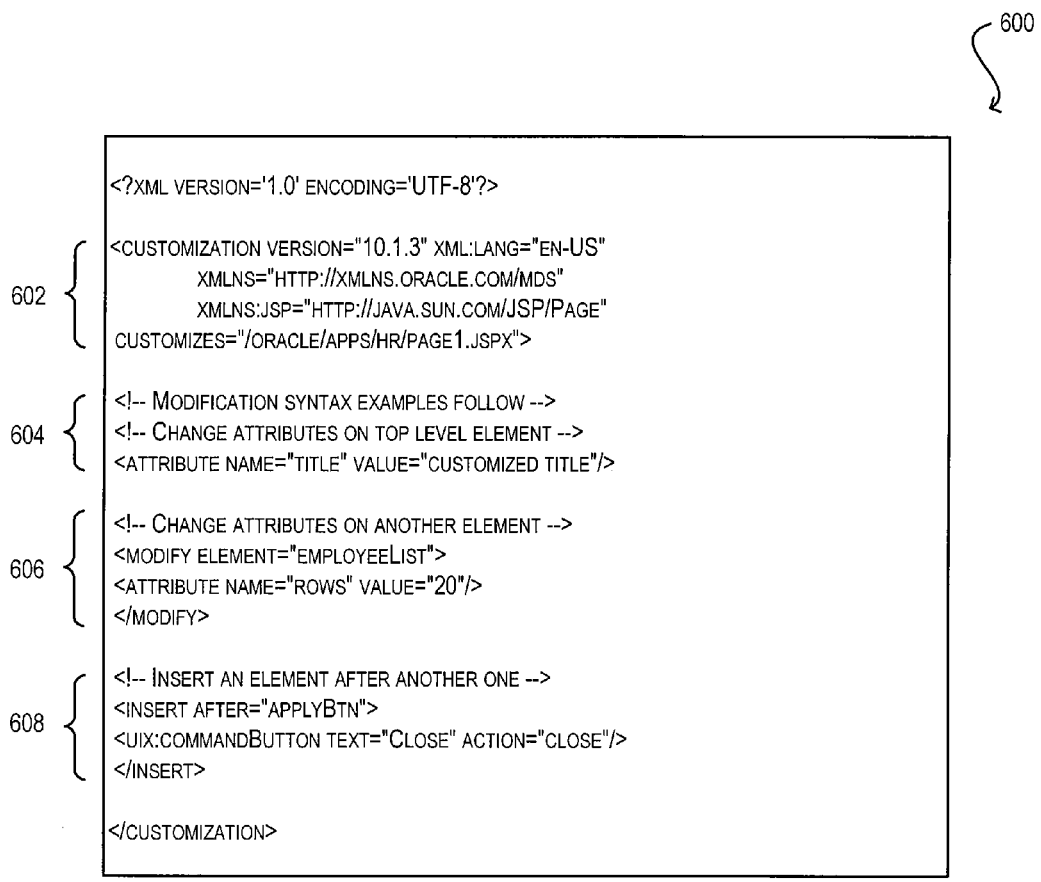
FIG. 6 is a code sample illustrating an exemplary customization in accordance with an embodiment of the present invention.

FIG. 6 is a code sample illustrating an exemplary customization 600 for a base metadata document of a software application in accordance with an embodiment of the present invention. In the sample shown, customization 600 is formatted in XML. However, customizations may be formatted in any type of markup language, such as HTML, SGML, and the like. In one set of embodiments, customization 600 may be a seeded customization that is provided by a supplier/developer of the application. In another set of embodiments, customization 600 may be a user customization that is created by a user of the application.

As shown, customization 600 uses a specific customization syntax. According to one embodiment, this syntax includes a top-level "CUSTOMIZATION" element 602 that is used to reference the base metadata document customized by the present customization. For example, element 602 includes a "CUSTOMIZES" attributes that indicates the base metadata document customized by customization 600 is "/ORACLE/APPS/HR/PAGE1.JSPX." In other embodiments, element 602 may be omitted. In various embodiments, a customization may only reference, and therefore customize, a single base metadata document. In alternative embodiments, a customization may be configured to customize multiple base metadata documents.

The customization syntax illustrated in FIG. 6 further includes one or more elements for defining modifications to a source element of the base metadata document. According to one aspect, if a modification applies to an attribute of top-level element in the base metadata document, the modification may be expressed as an attribute tag identifying the attribute name and the modified value. For example, attribute tag 604 illustrates a modification to the attribute "TITLE." However, all other modifications to a source element are expressed as an element that includes a required "ELEMENT" attribute. The value of the ELEMENT attribute uniquely identifies the source element being modified. In most cases, the value of the ELEMENT attribute will be set to a unique identifier of the source element. If no unique identifier exists, the ELEMENT attribute may be set to an XPath expression configured to select the source element.

The one or more elements for defining modifications to a source element may include a "MODIFY" element for inserting, replacing, or removing attributes of the source element. For example, customization 600 includes a "MODIFY" element 606 defining a replacement for an attribute value of the source element "EMPLOYEELIST." The one or elements may also include a "MOVE" element for reordering or re-parenting the source element, and a "REPLACE" element for replacing the source element with another element, or removing the source element altogether.

In various embodiments, the customization syntax may further include an "INSERT" element for inserting a new element into the base metadata document. In one embodiment, the INSERT element includes one or more position-related attributes such as "AFTER" or "BEFORE." The position-related attributes identify where the new element will be inserted in relation to an existing source element. For example, the INSERT element 608 of FIG. 6 indicates that a new element "COMMANDBUTTON" will be inserted after the existing element "APPLYBTN."

Although not shown in FIG. 6, the customization syntax used therein may be expressed as an XML schema. In one embodiment, the schema may included in the same file as customization 600. In other embodiments, the schema may be included in a separate XML Schema Definition (XSD) file.

In various embodiments, customization 600 may created/updated via a customization creation/update component included in metadata engine 302 of FIG. 3. The customization creation/update component may be used to create or update customizations at any level (e.g., user, group, site, etc.). Further, the customization creation/update component may be configured to interoperate with any pre-existing user interface designed to create/update metadata documents. For example, the customization creation/update component may be configured to interoperate with an XML editor designed to create/update XML documents using standardized DOM-based or JAXB-based method calls. In this manner, customizations may be created or updated transparently using pre-existing metadata authoring tools.

In one set of embodiments, a customization for a metadata document is created/updated by retrieving the metadata document, and receiving one or more changes to the metadata document using standardized method calls. For example, the metadata document may be retrieved as a DOM document object, and the changes may be in the form of standardized DOM method calls. Alternatively, the metadata document may be retrieved as a Java Architecture for XML Bindings (JAXB) based in-memory representation, and the changes may be in the form of standardized JAXB method calls. The changes are then automatically transformed into one or more customization instructions that are stored as a customization (such as customization 600). The customization is stored separately from the metadata document.

If there are multiple customization classes (i.e., customization levels) associated with the metadata document, the customization instructions are stored in a customization corresponding to the last customization class to be applied to the document (also known as the "tip" customization class). If this customization already exists, the existing customization is updated. If this customization does not exist, a new customization is created.

The feature of creating/updating customizations from standard XML updates is useful both at application runtime and design time. For example, it may be incorporated into a design time tool (such as ORACLE JDEVELOPER) to enable the creation/update of seeded customizations. Further, the customization creation/update component may be incorporated into one or more runtime user interfaces (e.g., a page editor within a software application) to enable the creation/update of user customizations at application runtime.

In one set of embodiments, the customization creation/update component is configured to generate the best customization instruction to ensure that a patch/upgrade of a base metadata document can be done. For example, if a modified element in the base metadata document has a unique identifier, that unique identifier is used to reference the modified element in the corresponding customization instruction. This makes the customization instruction robust against possible structural changes made to the base metadata document (e.g., as part of a patch or upgrade). If the modified element does not have a unique identifier, but has a "locally-unique" identifier (i.e., unique within its siblings), the modified element is referenced using an XPath expression that includes the locally-unique identifier. Finally, if the modified element does not have a unique identifier or a locally-unique identifier, the modified element is referenced using an XPath expression.

In the case of an insert instruction, one of three existing elements in the base metadata document may be used to identify the location of the insert: an "after" sibling, a "before" sibling, or a parent element. Each of these three elements are checked to determined whether they have a unique identifier or a locally-unique identifier. Preference is given to the element that has a unique identifier. If more that one of the three have a unique identifier, the above order is used to select one.

In some cases, a subtree may be removed from one location in the metadata document and added either at a different location under the same parent, or to a different parent. In this situation, the customization creation/update component will detect such consecutive changes and will generate a move instruction. Generally speaking, using a move instruction rather than a series of replace and insert instructions is preferable for preserving customizations in the face of structural changes to the metadata document. Note that this can be achieved even if the metadata document is being updated using an API that does not support a "move" operation natively (e.g., DOM API).

In one set of embodiments, the customization instructions generated as part of a create or update operation may be optimized prior to being stored as a customization. These optimizations may include (1) combining multiple MODIFY elements for a single source element into a single MODIFY element; (2) combining an INSERT element and one or more MODIFY elements for portions of the inserted element's sub-tree into a single INSERT element; and (3) removing an INSERT element and a subsequent REPLACE element that deletes the inserted element. These optimizations provide the dual benefits of compacting the size of customization documents and improving the performance of metadata engine 302 when applying customizations to base metadata documents at runtime.

According to one embodiment, the optimizations described above may apply to changes performed across sessions (i.e., changes performed and saved at different points in time). For example, a new element may be inserted at one point in time and the customization may be saved. At a later point in time, a modification may be made to a subtree of the element inserted earlier. This modification may be combined with the prior insertion, even though the two operations were performed at different times.

According to another embodiment, the optimization process takes into account situations where a customization may apply to two or more other customizations. For example, consider a user-level customization that may be applied on top of both a "role-manager" level customization and a "role-employee" level customization. In this situation, the user-level customization may include certain customization instructions that apply to elements included in the role-manager customization, but are not included in the role-employee customization. Such customization instructions are automatically identified and preserved during the optimization process (even though they do not apply to the "role-employee" context).

Figure 10:
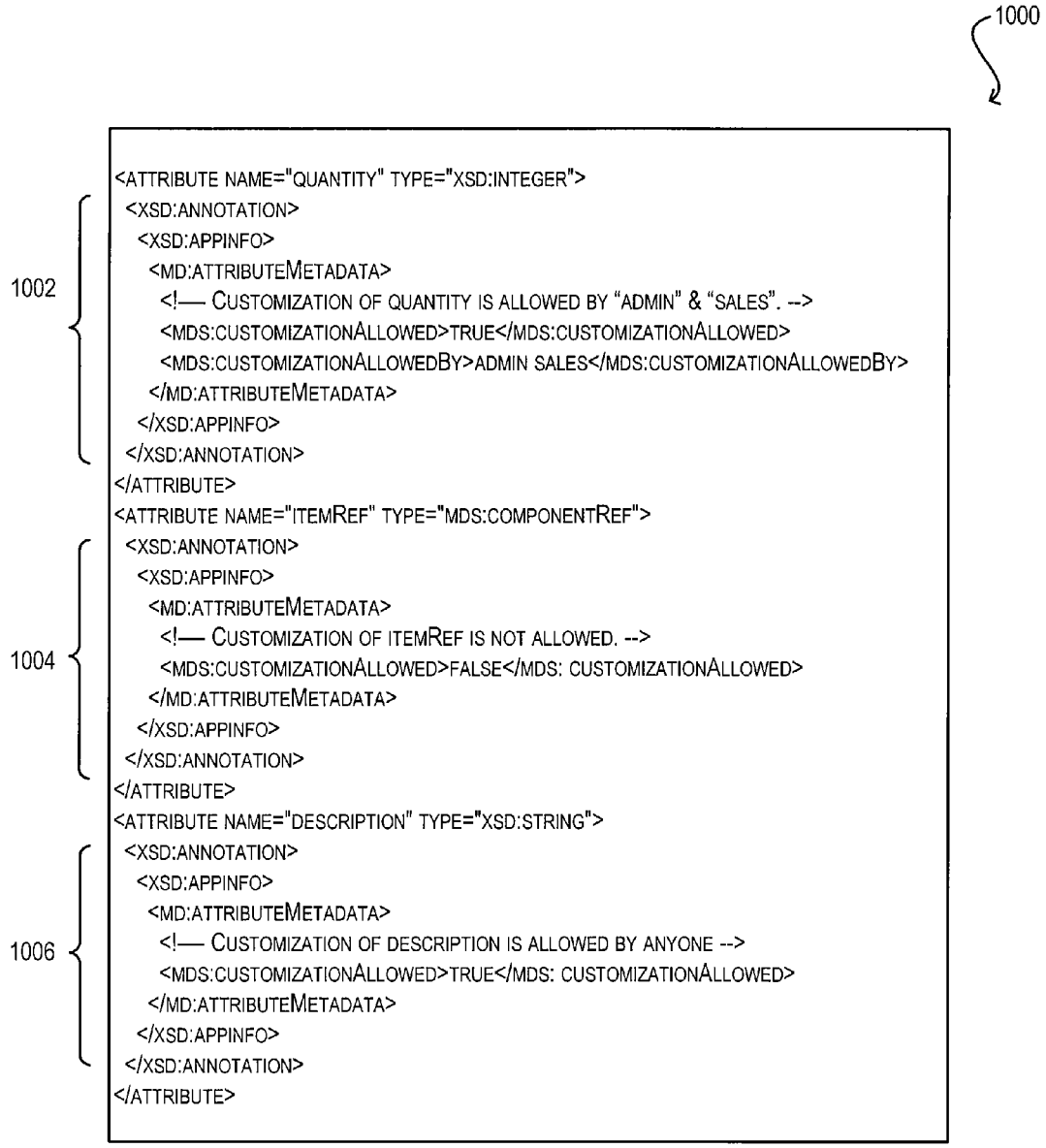
FIG. 10 is a code sample illustrating a customization policy in accordance with an embodiment of the present invention.

As discussed above, embodiments of the present invention also provide a mechanism for restricting the customizability of a base metadata document (or portions thereof) by one or more users. This mechanism is enabled through a declarative syntax for defining customization restrictions, and an evaluation engine for enforcing the customization restrictions. As used herein, a customization restriction is a control that affects the customizability of a given metadata object instance. A first type of customization restriction controls whether customization is allowed. A second type of restriction identifies the users that can customize (if customization is allowed). And a third type of restriction controls whether specific types of customization (i.e., modify, move, replace, etc.) are allowed. One or more restrictions for a given object may be grouped into a customization policy. An exemplary customization policy is illustrated in FIG. 10.

In an exemplary embodiment, customization restrictions (and thus, customization policies) may be defined for a metadata object type or a metadata object instance. Customization restrictions defined for a given object type will apply to all object instances having that type. Customization restrictions defined for a given object instance will apply only to that instance. In further embodiments, customization restrictions may be defined at the element type or attribute type level (for object types), or at the element instance or attribute instance level (for object instances).

Figure 7:
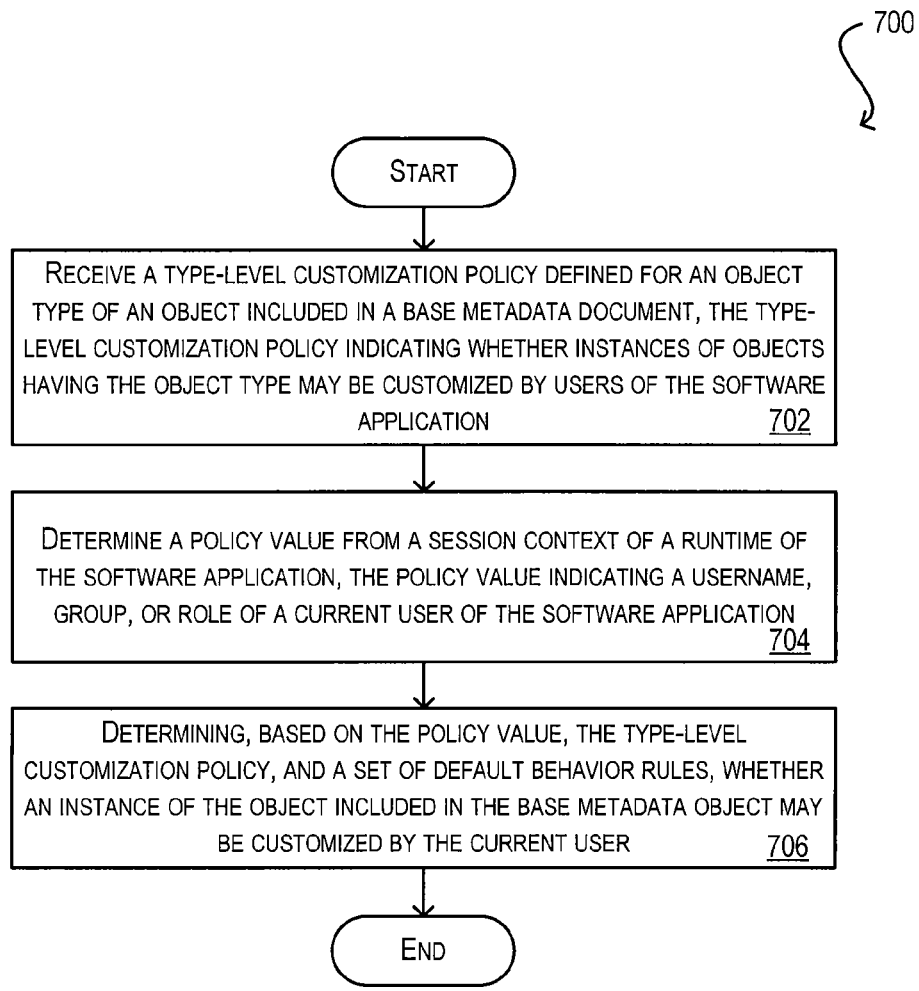
FIG. 7 is a flowchart illustrating the steps performed in restricting the customizability of a base metadata document using a type-level customization policy in accordance with an embodiment of the present invention.

FIG. 7 is a flowchart 700 illustrating one technique for restricting the customizability of a base metadata document in accordance with an embodiment of the present invention. In various embodiments, the processing of flowchart 700 may be implemented in software, hardware, or combinations thereof. As software, the processing of flowchart 700 may be implemented as part of metadata engine 302 of FIG. 3.

At step 702, a type-level customization policy defined for an object type of an object included in a base metadata document is received, where the type-level customization policy indicates whether instances of objects having the object type may be customized by users of a software application. In an exemplary embodiment, the customization restrictions included in the type-level customization policy are implemented as one or more type annotations to the object type. For example, if the object type is defined in an XSD file, the customization restrictions may be implemented as type annotations within the XSD file. Alternatively, the type annotations may be included in a standalone XML file or tag library.

At step 704, a policy value is determined from a session context of the software application. The policy value is a value used to determine whether the customization restrictions included in the type-level customization policy should be enforced for the current application session. Typically, customization restrictions will be enforced based on the identity of the current user of the application. Accordingly, the policy value will generally correspond to a user-related attribute, such as username, group, role, or the like. Of course, other types of policy values may also be used based on the customization requirements for the application.

At step 706, a determination is made whether an instance of the object included in the base metadata document may be customized by the current user of the application. This determination is based, at least in part, on the policy value determined at step 704 and the type-level customization policy. Thus, if the username of the current user is "User1," and the type-level customization policy includes a restriction disallowing customization by User1, the current user will be restricted from customizing the object instance. In various embodiments, the restrictions applied to the object instance may also depend on customization policies defined at the object instance level (rather than the object type level), and on customization policies defined for parent object types of the object's object type. This is discussed in greater detail with respect to FIGS. 8 and 9 below.

In some cases, there may be no customization policies applicable to an object instance of a base metadata document. In those situations, the set of default behavior rules are used to determine whether the object instance may be customized. In one embodiment, the default behavior rules may indicate that the object cannot be customized by any user if there are no applicable customization policies. In alternative embodiments, the default behavior rules may allow customization by a specific group of users (e.g., administrators), or by all users under certain conditions. One of ordinary skill in the art would recognize many variations, modifications, and alternatives.

Figure 8:
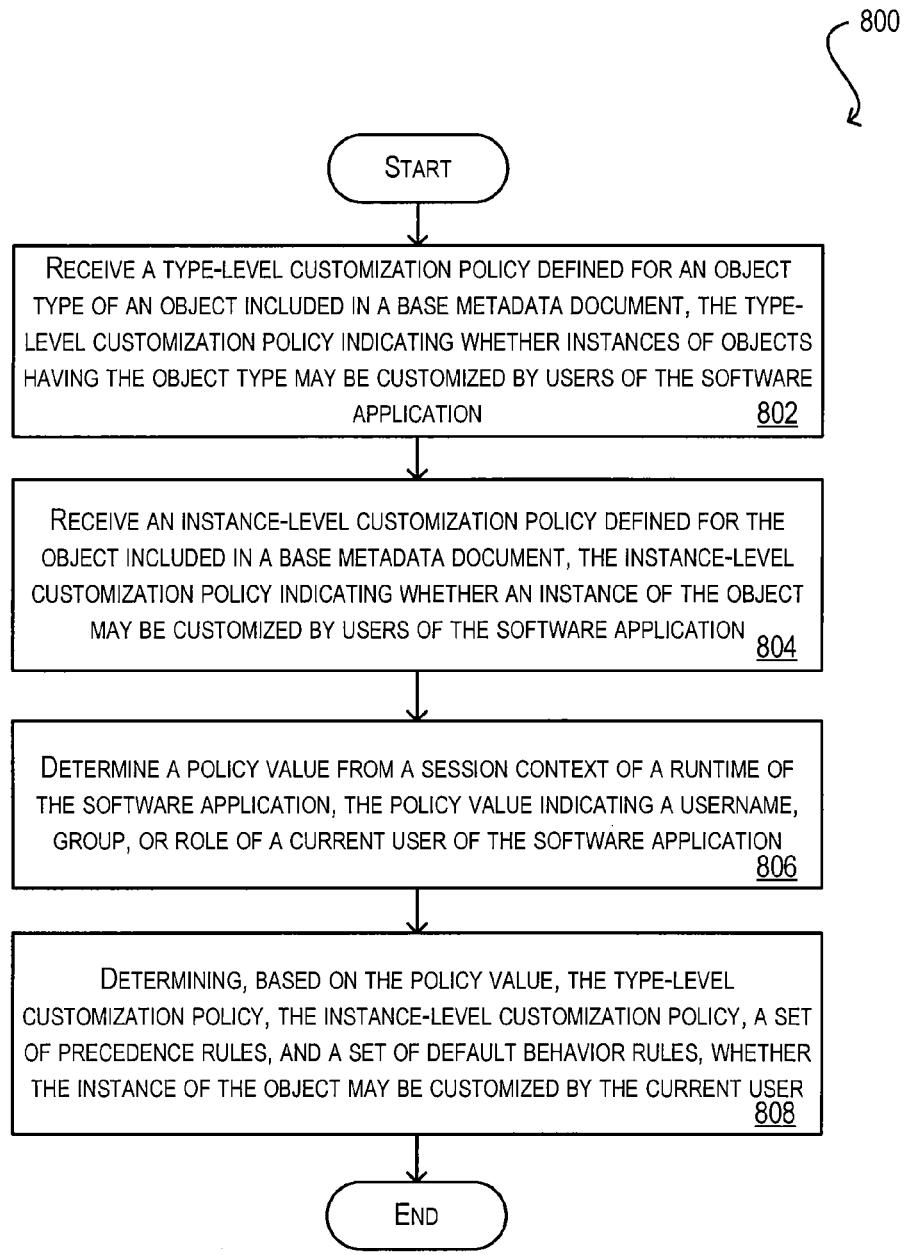
FIG. 8 is a flowchart illustrating the steps performed in restricting the customizability of a base metadata document using a type-level customization policy and an instance-level customization policy in accordance with an embodiment of the present invention.

FIG. 8 is a flowchart 800 illustrating another technique for restricting the customizability of a base metadata document in accordance with an embodiment of the present invention. Specifically, FIG. 8 illustrates the steps performed in enforcing restrictions on an object included in the base metadata document when both type-level and instance-level customization restrictions apply.

At step 802, a type-level customization policy defined for the object is received, where the type-level customization policy indicates whether instances of objects having the object type may be customized by users of the software application. At step 804, an instance-level customization policy is received, where the instance-level customization policy indicates whether an instance of the object may be customized by the users of the application. In an exemplary embodiment, the customization restrictions in the instance-level customization policy are implemented as one or more object annotations to the object. The object annotations may be stored in the base metadata document, or in one or more extended metadata files associated with the base metadata document.

At step 806, a policy value is determined from a session context of the application as in step 704 of FIG. 7. A determination is then made, based on the policy value, the type-level customization policy, the instance-level customization policy, a set of precedence rules, and a set of default behavior rules, whether an instance of the object may be customized by the current user (step 808). In this type of situation where multiple customization policies may apply to a given object instance, the set of precedence rules determine which customization policies actually apply. According to an exemplary set of precedence rules, restrictions in higher-precedence policies are automatically inherited by lower-precedence policies. Further, type-level policies have a higher precedence than instance-level policies. Accordingly, since the object instance in step 808 has both a type-level and object-level customization policy defined, the restrictions in the both the type-level and instance-level policies will apply.

In some cases, the type-level policy and instance-level policy may contain conflicting restrictions. In these situations, the set of precedence rules may also determine which restrictions override others. Generally speaking, lower-precedence restrictions cannot expand the scope of higher-precedence restrictions. For example, if a higher-precedence restriction disables customization for an object type/instance, a lower precedence restriction cannot enable customization of the object type/instance. However, lower-precedence restrictions can further limit the scope of higher-precedence restrictions. For example, if a higher-precedence restriction limits customization of an object type/instance to users in the group "Admin," a lower-precedence restriction can further limit customization of the object type/instance to users in the group "Sales." In this example, an instance of the object will be customizable only by users in both "Admin" and "Sales."

It should be appreciated that the specific steps illustrated in FIGS. 7 and 8 provide particular methods for restricting the customizability of a base metadata document according to embodiments of the present invention. Other sequences of steps may also be performed according to alternative embodiments. For example, alternative embodiments of the present invention may perform the steps outlined above in a different order. Moreover, the individual steps illustrated in FIGS. 7 and 8 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 9:
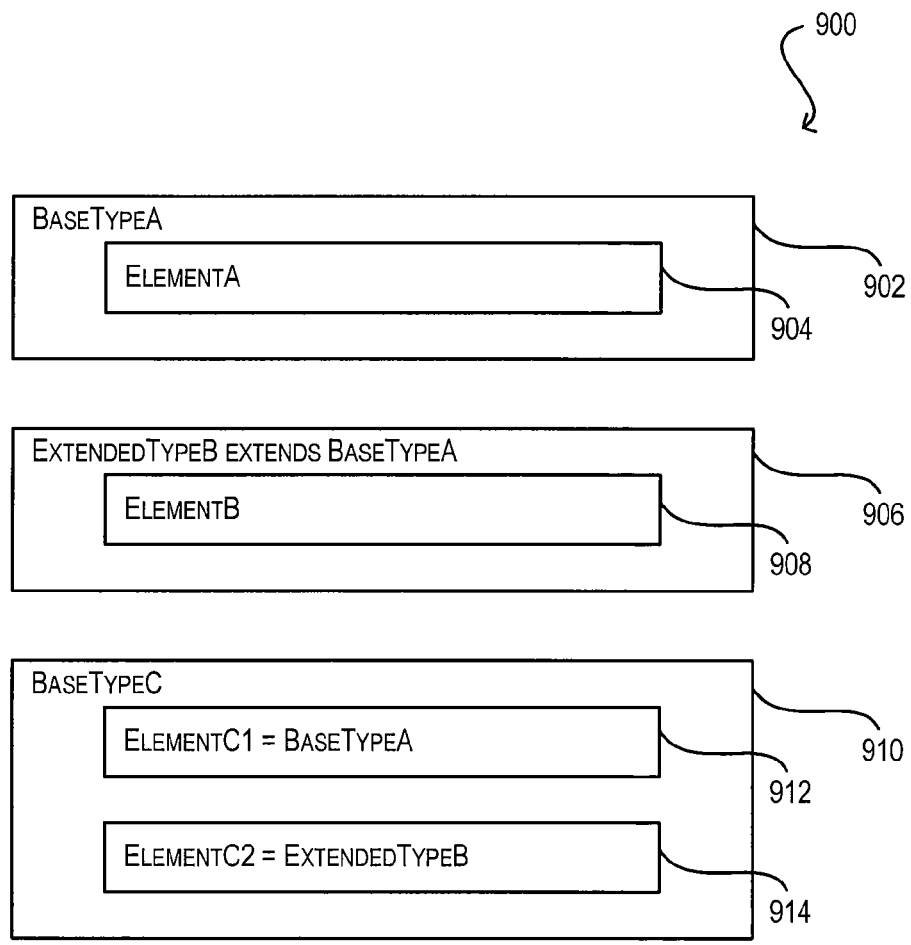
FIG. 9 is a simplified block diagram illustrating an object type hierarchy in accordance with an embodiment of the present invention.

In some embodiments, the customization restrictions that apply to a given object instance will depend on how the object instance is instantiated. For example, assume a set of precedence rules where restrictions in higher-precedence customization policies are automatically inherited by lower-precedence policies, where type-level policies have a higher precedence than object-level policies, and where super-type-level policies have a higher precedence than type-level policies. Further, assume a collection of object type definitions 900 as illustrated in FIG. 9. As shown, object type definitions 900 include three object types: BaseTypeA (902), ExtendedTypeB (906), and BaseTypeC (910). BaseTypeA includes ElementA (904). ExtendedTypeB extends from BaseTypeA and includes ElementB (908). BaseTypeC includes ElementC1 (912), which is of type BaseTypeA, and Element C2 (914), which is of type ExtendedTypeB.

Given the above, the customization policies that apply to an instance of ElementA will depend on how ElementA is instantiated. If ElementA is instantiated as part of an instance of BaseTypeA, the customization policies of the instance document and BaseTypeA will apply. If ElementA is instantiated as part of an instance of ExtendedTypeB, the customization policies of the instance document, BaseTypeA, and ExtendedTypeB will apply. If ElementA is instantiated as part of an instance of BaseTypeC/ElementC2, the customization policies of the instance document, BaseTypeA, ExtendedTypeB, and BaseTypeC will apply.

FIG. 10 is a code sample illustrating a exemplary type-level customization policy 1000 for a software application in accordance with an embodiment of the present invention. In the sample shown, customization policy 1000 is formatted in XML. However, customization policies may be formatted in any type of markup language, such as HTML, SGML, and the like. In one set of embodiments, customization policy 1000 may be provided by a supplier/developer of the application. In another set of embodiments, customization policy 1000 may be created by a user of the application. In the latter case, a design tool may be provided by the supplier/developer for creating, viewing, and/or editing customization policies.

As shown, customization policy 1000 is implemented as a plurality of type annotations 1002, 1004, 1006. Annotation 1002 defines a customization restriction indicating that the attribute type "QUANTITY" may be customized by users in the groups of "ADMIN" and "SALES." Annotation 1004 defines a customization restriction indicating that the attribute type "ITEMREF" cannot be customized. And annotation 1006 defines a customization restriction indicating that attribute type "DESCRIPTION" can be customized by any user. Although annotations 1002, 1004, 1006 utilize a specific syntax for defining customization restrictions, any other suitable syntax may be employed. One of ordinary skill in the art would recognized many variations, modifications, and alternatives.

Figure 11A:
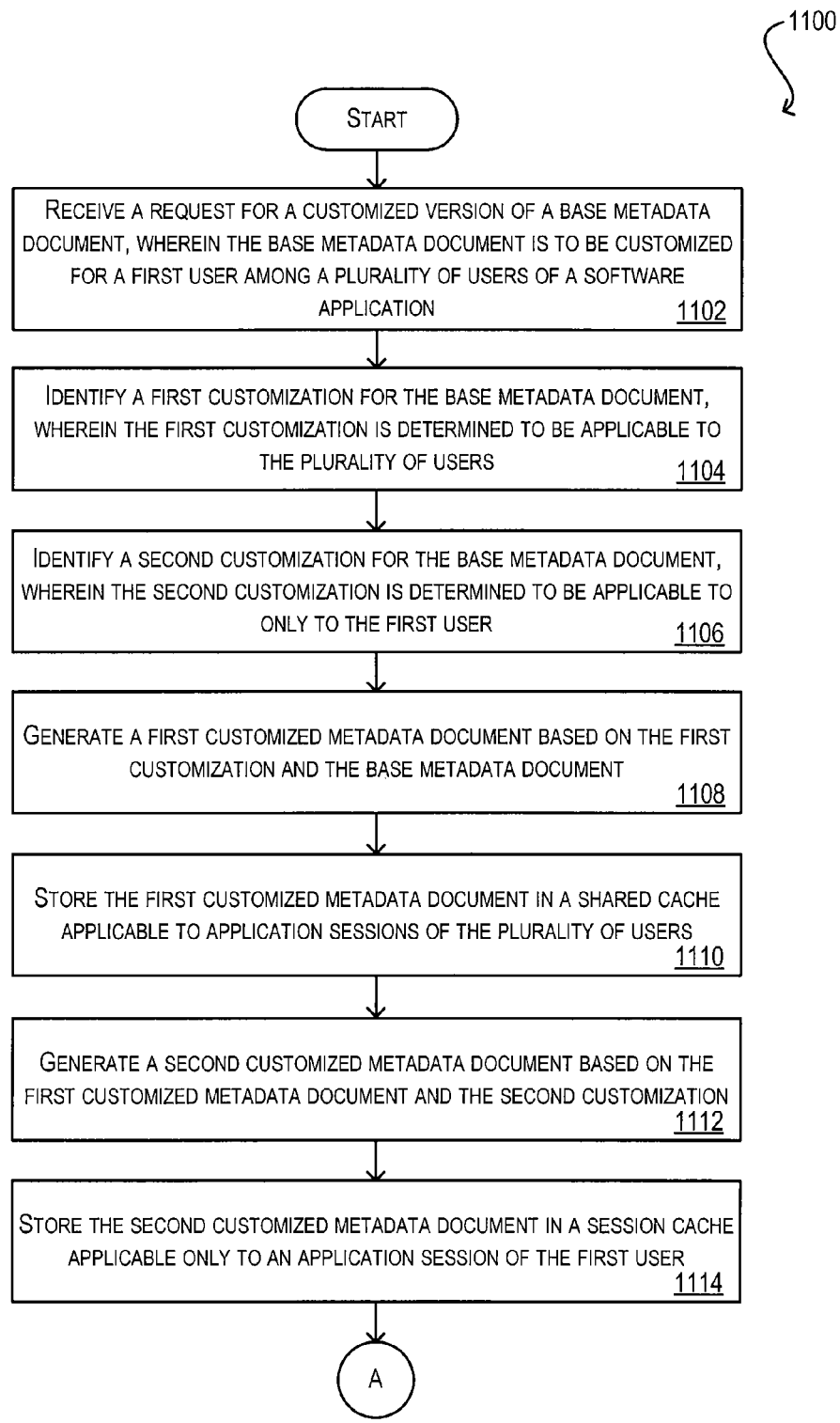
FIGS. 11A and 11B are flowcharts illustrating the steps performed in caching customized metadata documents in accordance with an embodiment of the present invention.
Figure 11B:
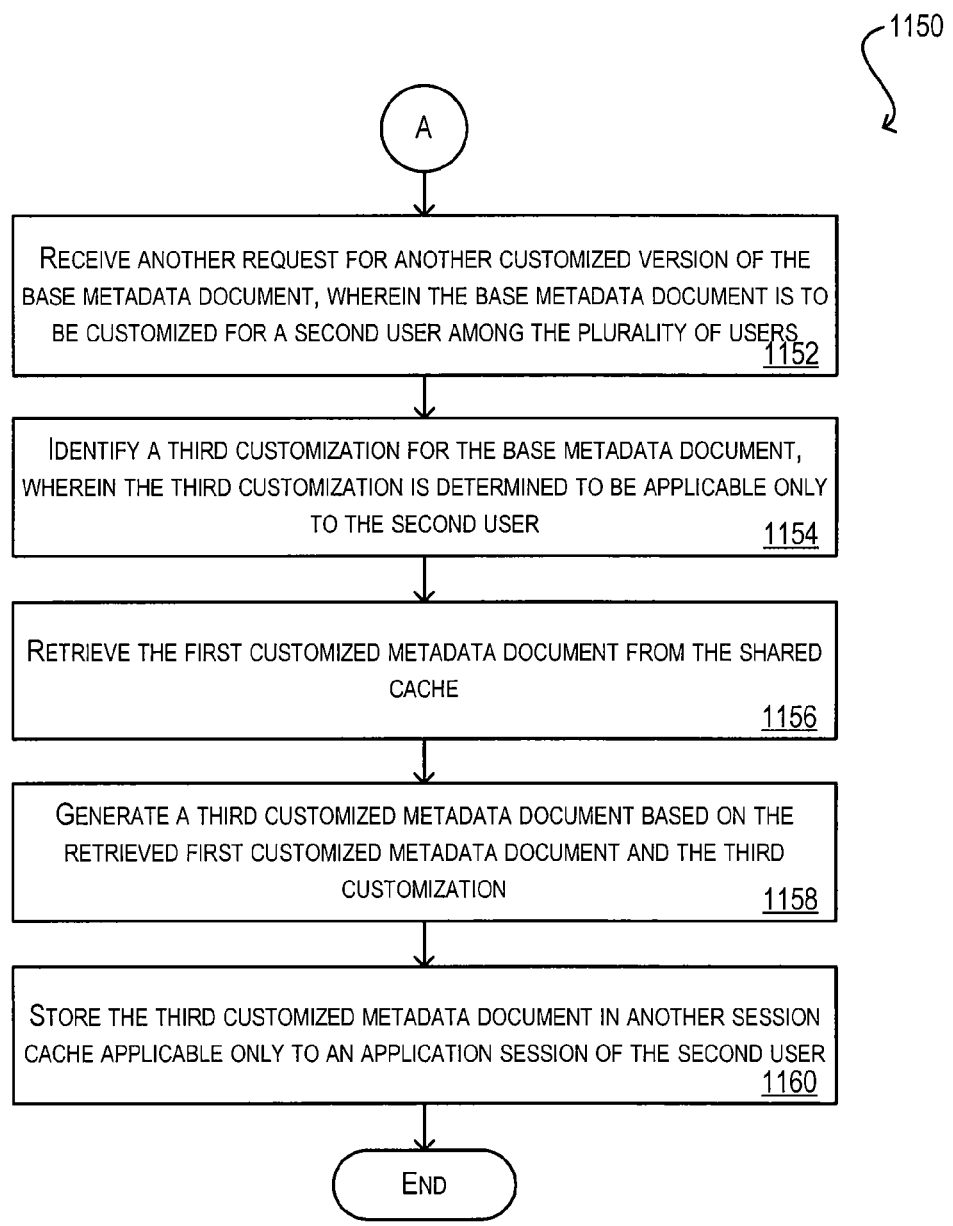

FIGS. 11A and 11B are flowcharts 1100, 1150 illustrating the steps performed in caching customized metadata documents in accordance with an embodiment of the present invention. In particular, flowcharts 1100, 1150 describe the use of a layered cache to optimize the lookup of customized metadata documents at application runtime. In various embodiments, the processing of flowcharts 1100, 1150 may be implemented in software, hardware, or combinations thereof. As software, the processing of flowcharts 1100, 1150 may be implemented as part of metadata engine 302 of FIG. 3.

At step 1102, a request for a customized version of a base metadata document is received, where the base metadata document is to be customized for a first user among a plurality of users of a software application. Upon receiving the request, a first customization for the base metadata document is identified, where the first customization is determined to be applicable to the plurality of users (step 1104). For example, the first customization may be a site-level customization. Additionally, a second customization for the base metadata document is identified, where the second customization is determined to be applicable to only the first user (step 1106). For example, the second customization may be a user-level customization. In various embodiments, the first and second customizations are determined according to the steps of FIG. 2 as described above.

At step 1108, a first customized metadata document is generated based on the first customization and the base metadata document. The first customized metadata document can be considered an "intermediate" version of the final customized document because only the first customization has been applied. The first customized metadata document is then stored in a shared cache configured to store data for application sessions of the plurality of users (1110). Since the first customization applies to every user in the plurality of users, it is likely that the first customized metadata document will need to be generated again in response to other user requests (e.g., as a base for applying further customizations). Thus, by caching the first customized metadata document in the shared cache, the document can be retrieved quickly and efficiently.

At step 1112, a second customized metadata document is generated based on the first customized metadata document and the second customization. The second customized metadata document can be considered the "final" customized version of the base metadata document. The second customized metadata document is then stored in a session cache configured to store data only for an application session of the first user (step 1114). Thus, the second customized metadata document can be retrieved quickly and efficiently from the session cache if requested again by an application session of the first user. The second customized metadata document may then be returned to the requestor.

At a later point in time, another request for another customized version of the base metadata document is received, where the base metadata document is to be customized for a second user among the plurality of users (step 1152). In response, a third customization for the base metadata document is identified, where third customization is determined to be applicable only to the second user (step 1154). For example, the third customization may be a user-level customization for the second user. In addition, since the third customization needs to be applied on top of the base metadata document and the first customization, the first customized metadata document is retrieved from the shared cache (step 1156). Note that the base metadata document and the first customization do not need to be retrieved and merged again, thereby substantially improving performance. A third customized metadata document is then generated from the first customized metadata document and the third customization, and the third customized metadata document is stored in another session cache configured to store data only for an application session of the second user (steps 1158, 1160). The third customized metadata document may then be returned to the requestor.

Using the techniques of FIGS. 11A and 11B, metadata engine 302 of FIG. 3 may intelligently cache customized variants of a base metadata document and thereby optimize the generation of customized metadata documents that share common customizations. In one set of embodiments, metadata engine 302 may automatically determine whether to store a customized metadata document in the shared cache or a session cache based on the customizations applied. In other embodiments, a cache hint may be included in each customization. The cache hint indicates to metadata engine 302 whether to cache an application of the customization, and which cache to use.

Although FIGS. 11A and 11B illustrate a specific case where only two customization levels (a group level customization and a user level customization) apply to a base metadata document, the layered cache of the present invention may also be used in situations where more than two customization levels apply. For example, assume a scenario where three customization levels (division, department, user) are associated with a base metadata document. Further, assume that user "user1," who is a member of division "Engineering" and department "cooling systems," requests the document. In this scenario, a first customized metadata document based on the customization for division "Engineering" will be generated and stored in the shared cache. The first customized metadata document will be used as a starting point for customizing the base metadata document in cases where the base metadata document is requested by another user in the division "Engineering" (but in a different department). Further, a second customized metadata document based on the customizations for division "Engineering" and department "cooling systems" will be generated and stored in the shared cache. The second customized metadata document will be used as a starting point for customizing the base metadata document in cases where the base metadata document is requested by another user in division "Engineering" and department "cooling systems." Finally, a third customized metadata document based on the customizations for division "Engineering," department "cooling systems," and user "user1" will be generated and stored in a session cache specific to user1. The third customized metadata document will be used to service future requests by user1 for the base metadata document.

Figure 12A:
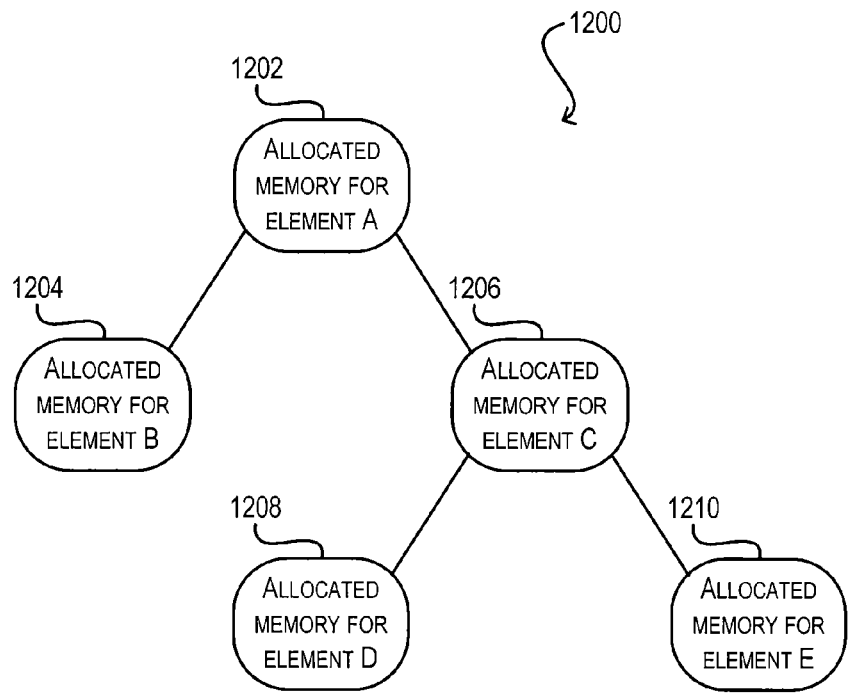
FIGS. 12A and 12B are simplified block diagrams illustrating tree memory structures for representing metadata documents in working memory in accordance with an embodiment of the present invention.
Figure 12B:
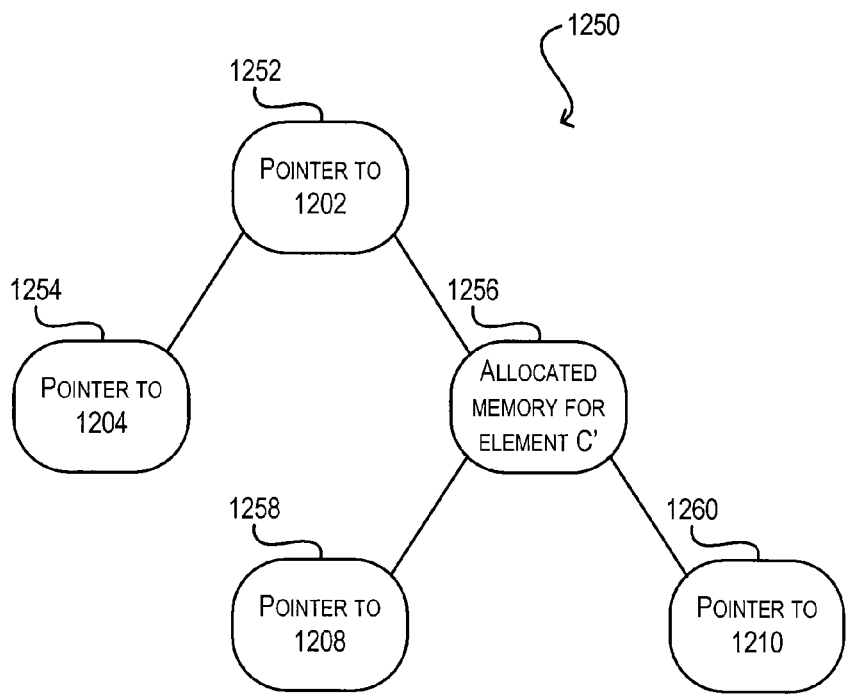

FIGS. 12A and 12B are simplified block diagrams illustrating tree memory structures 1200, 1250 for representing metadata documents in working memory in accordance with an embodiment of the present invention. In one set of embodiments, tree structures such as 1200, 1250 may be used to optimize the storage of customized metadata documents in the layered cache described above.

Tree structure 1200 is an exemplary data structure for a first metadata document stored in working memory. Assume that the first metadata document includes five elements A, B, C, D, E. As shown, tree structure 1200 includes five nodes 1202, 1204, 1206, 1208, 1210, corresponding to elements A, B, C, D, E respectively. In addition, the hierarchical relationships between nodes 1202, 1204, 1206, 1208, 1210 correspond to the hierarchical relationships between elements A, B, C, D, E. Each node includes an allocated memory area for storing data pertaining to its corresponding element.

Tree structure 1250 is an exemplary data structure for a second metadata document stored in working memory. Assume that the second metadata document includes five elements A, B, C', D, E, where elements A, B, D, E are identical to elements A, B, D, E in the first metadata document, and where C' is a modified version of element C. In this case, since the data for elements A, B, D, E are already stored in working memory at nodes 1202, 1204, 1208, 1210 of tree structure 1200, that data does not need to be duplicated in tree structure 1250. Accordingly, nodes 1252, 1254, 1258, 1260 in tree structure 1250 can simply store pointers to corresponding nodes 1202, 1204, 1208, 1210. Since element C' has been changed from element C, a new memory area is allocated for element C' at node 1256 in tree structure 1250.

Using memory structures such as tree structures 1200, 1250, customized metadata documents may be cached in the layered cache described above in a highly optimized manner. For example, customized variants of a base metadata document often share a large number of common elements. Since instances of common elements are not duplicated in memory as described with respect to structures 1200, 1250, a large number of customized variants may be stored in a relatively small memory footprint. In one set of embodiments, only a modified element (e.g., node 1256) of a metadata document (e.g., tree 1250) is allocated a new memory area if a variant of the metadata document (e.g., tree 1200) is already stored in working memory. In other embodiments, the modified element and all of its parent elements (e.g., nodes 1256, 1252) may be allocated new memory areas, even if the parent elements are identical to the parent elements in the existing variant.

Figure 13:
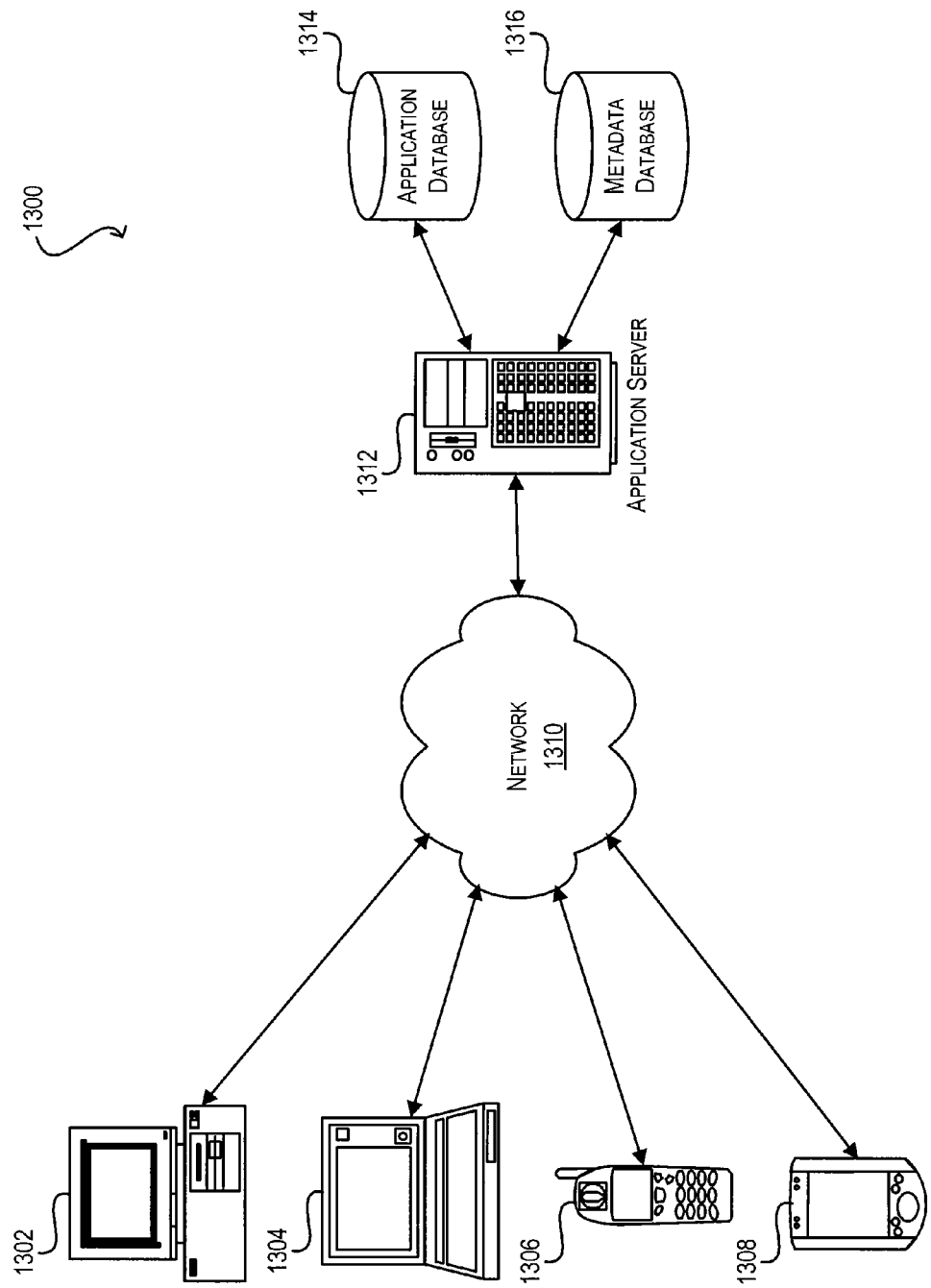
FIG. 13 is a simplified block diagram illustrating a system environment that may be used in accordance with an embodiment of the present invention.

FIG. 13 is a simplified block diagram illustrating components of an exemplary system environment 1300 that may be used in accordance with an embodiment of the present invention. As shown, system environment 1300 includes one or more client computing devices 1302, 1304, 1306, 1308, which are configured to operate a client application such as a web browser, proprietary client (e.g., ORACLE FORMS), or the like. In various embodiments, client computing devices 1302, 1304, 1306, 1308 may be used to interact with a metadata driven software application such as application 314 of FIG. 3.

Client computing devices 1302, 1304, 1306, 1308 may be general purpose personal 30 computers (including, by way of example, personal computers and/or laptop computers running various versions of MICROSOFT WINDOWS and/or APPLE MACINTOSH operating systems), cell phones or PDAs (running software such as MICROSOFT WINDOWS MOBILE and being Internet, e-mail, SMS, BLACKBERRY, or other communication protocol enabled), and/or workstation computers running any of a variety of commercially-available UNIX or UNIX-like operating systems (including without limitation the variety of GNU/Linux operating systems). Alternatively, client computing devices 1302, 1304, 1306, 1308 may be any other electronic device, such as a thin-client computer, Internet-enabled gaming system, and/or personal messaging device, capable of communicating over a network (e.g., network 1310 described below). Although exemplary system environment 1300 is shown with four client computing devices, any number of client computing devices may be supported.

In most embodiments, system environment 1300 includes a network 1310. Network 1310 may be any type of network familiar to those skilled in the art that can support data communications using any of a variety of commercially-available protocols, including without limitation TCP/IP, SNA, IPX, AppleTalk, and the like. Merely by way of example, network 1310 can be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.11 suite of protocols, the Bluetooth protocol known in the art, and/or any other wireless protocol); and/or any combination of these and/or other networks.

System environment 1300 also includes one or more server computers 1312 which may be general purpose computers, specialized server computers (including, by way of example, PC servers, UNIX servers, mid-range servers, mainframe computers, rack-mounted servers, etc.), server farms, server clusters, or any other appropriate arrangement and/or combination. In various embodiments, server 1312 may be adapted to run one or more services or software applications described in the foregoing disclosure. For example, as shown in FIG. 13, server 1312 may correspond to an application server configured to execute metadata-driven application 314 of FIG. 3. Server 1312 may also be configured to run metadata engine 302 of FIG. 3. In alternative embodiments, metadata engine 302 may be executed on a server computer separate from application server 1312.

Server 1312 may run an operating system including any of those discussed above, as well as any commercially available server operating system. Server 1312 may also run any of a variety of additional server applications and/or mid-tier applications, including HTTP servers, FTP servers, CGI servers, JAVA servers, database servers, and the like. Exemplary database servers include without limitation those commercially available from ORACLE, MICROSOFT, SYBASE, IBM and the like.

System environment 1300 may also include one or more databases 1314, 1316. For instance, databases 1314, 1316 may include an application database 1314 configured to store transactional data for applications hosted on server 1312, and a metadata database 1316 configured to store metadata for the applications as well as a metadata engine such as metadata engine 302 of FIG. 3. Databases 1314, 1316 may reside in a variety of locations. By way of example, one or more of databases 1314, 1316 may reside on a storage medium local to (and/or resident in) server 1312. Alternatively, databases 1314, 1316 may be remote from server 1312, and in communication with server 1312 via a network-based or dedicated connection. In one set of embodiments, databases 1314, 1316 may reside in a storage-area network (SAN) familiar to those skilled in the art. Similarly, any necessary files for performing the functions attributed to server 1312 may be stored locally on server 1312 and/or remotely, as appropriate. In one set of embodiments, databases 1314, 1316 may include relational databases, such as ORACLE 10G, that are adapted to store, update, and retrieve data in response to SQL-formatted commands.

Figure 14:
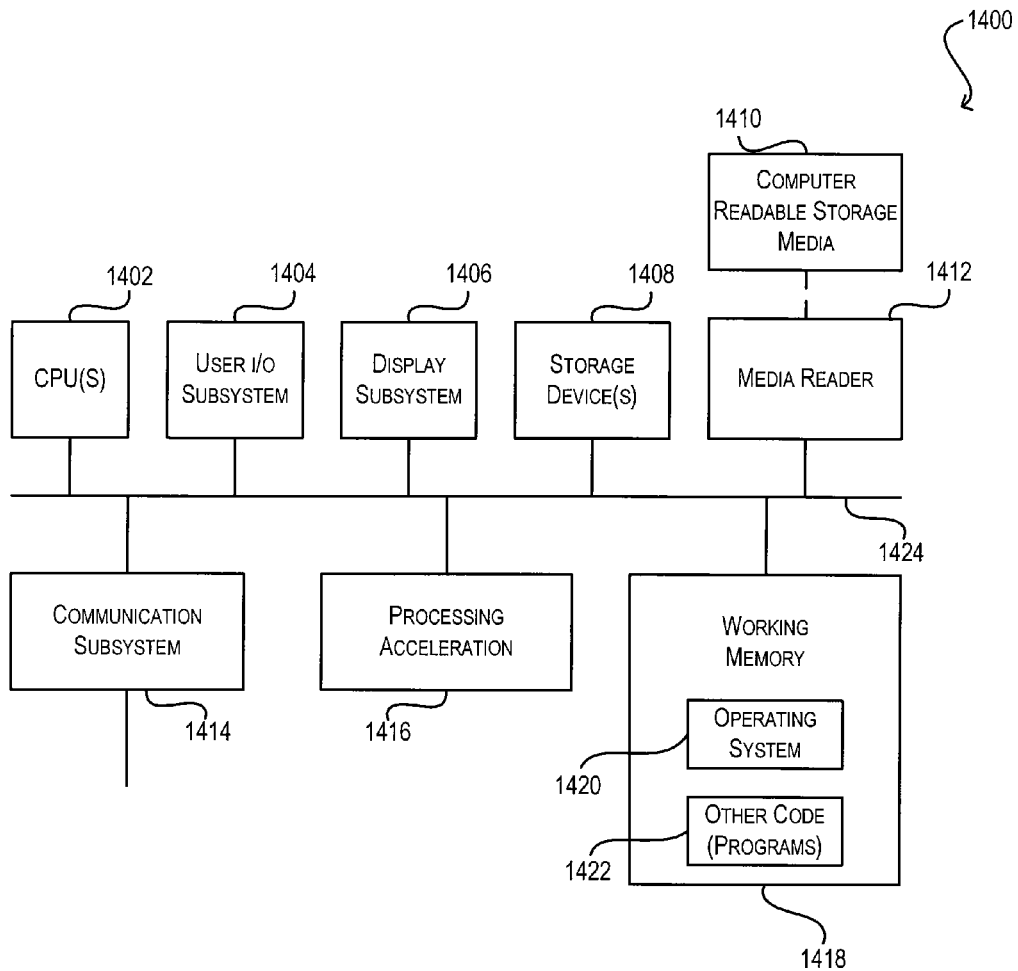
FIG. 14 is a simplified block diagram illustrating a computer system that may be used in accordance with an embodiment of the present invention.

FIG. 14 illustrates an exemplary computer system 1400 that may be used in accordance with embodiments of the present invention. In various embodiments, system 1400 may be used to implement any of the computers 1302, 1304, 1306, 1308, 1312 described above. Computer system 1400 is shown comprising hardware elements that may be electrically coupled via a bus 1424. The hardware elements may include one or more central processing units (CPUs) 1402, one or more input devices 1404 (e.g., a mouse, a keyboard, etc.), and one or more output devices 1406 (e.g., a display device, a printer, etc.). Computer system 1400 may also include one or more storage devices 1408. By way of example, the storage device(s) 1408 may include devices such as disk drives, optical storage devices, and solid-state storage devices such as a random access memory (RAM) and/or a read-only memory (ROM), which can be programmable, flash-updateable and/or the like.

Computer system 1400 may additionally include a computer-readable storage media reader 1412, a communications subsystem 1414 (e.g., a modem, a network card (wireless or wired), an infra-red communication device, etc.), and working memory 1418, which may include RAM and ROM devices as described above. In some embodiments, computer system 1400 may also include a processing acceleration unit 1416, which can include a digital signal processor (DSP), a special-purpose processor, and/or the like.

Computer-readable storage media reader 1412 can further be connected to a computer-readable storage medium 1410, together (and, optionally, in combination with storage device(s) 1408) comprehensively representing remote, local, fixed, and/or removable storage devices plus storage media for temporarily and/or more permanently containing computer-readable information. Communications system 1414 may permit data to be exchanged with network 1310 and/or any other computer described above with respect to system environment 1300.

Computer system 1400 may also comprise software elements, shown as being currently located within working memory 1418, including an operating system 1420 and/or other code 1422, such as an application program (which may be a client application, Web browser, mid-tier application, RDBMS, etc.). In an exemplary embodiment, working memory 1418 may include executable code and associated data structures (such as caches) for metadata engine 302 of FIG. 3. It should be appreciated that alternative embodiments of computer system 1400 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by a computer.

While the present invention has been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method for customizing a software application, the method comprising:

retrieving a first metadata document via a software component configured to enable creation and/or update of XML documents, wherein: the first metadata document is based at least in part on Extensible Markup Language (XML); content of the first metadata document at least partially defines one or more characteristics of at least a portion of a software application; and at least one of the one or more characteristics corresponds to one or more of content, behavior, and/or appearance;

in response to retrieving the first metadata document, creating in memory, a metadata object to represent the first metadata document;

receiving, from the software component, one or more modifications to the metadata object, wherein the one or more modifications: are expressed as method calls performed on the metadata object; and comprise a modification to a source element in the first metadata document;

translating the one or more method calls into one or more customization instructions, wherein the one or more customization instructions, when executed, cause at least the portion of the software application to change at least one of the one or more characteristics, the translating comprising: checking whether each of a plurality of elements is associated with a respective unique identifier, the plurality of elements comprising a sibling element, a parent element, and the source element; selecting a unique identifier based on a predetermined order comprising determining whether the source element is associated with a globally unique identifier and, if the source element is not associated with the globally unique identifier, determining whether the source element is associated with a locally unique identifier; and generating at least one customization instruction of the one or more customization instructions to reference the modification to the source element based at least in part on the checking and the selecting; and storing in a second metadata document the one or more customization instructions as a first customization for the first metadata document, wherein the first customization is stored separately from the first metadata document.

2. The method of claim 1, wherein the software component is an XML editor included in the software application, and wherein the steps of retrieving the first metadata document, receiving the one or more modifications, translating the one or more method calls, and storing the one or more customization instructions are performed at runtime of the software application.

3. The method of claim 1, wherein the software component is an XML editor included in a software development tool, and wherein the steps of retrieving the first metadata document, receiving the one or more modifications, translating the one or more method calls, and storing the one or more customization instructions are performed at design time of the software application.

4. The method of claim 1, wherein the first metadata document is retrieved as a Document Object Model (DOM) object, and wherein the one or modifications are expressed as standard DOM method calls.

5. The method of claim 1, wherein the first metadata document is retrieved as a Java Architecture for XML Bindings (JAXB) representation, and wherein the one or modifications are expressed as standard JAXB method calls.

6. The method of claim 1, wherein a plurality of customization levels are associated with the first metadata document, and wherein the first customization corresponds to a tip customization level, the tip customization level being that last customization level in the plurality of customization levels to be applied to the first metadata document.

7. The method of claim 6, wherein if a customization already exists for the tip customization level, the one or more customization instructions are added to the existing customization.

8. The method of claim 6, wherein if a customization does not already exist for the tip customization level, the one or more customizations are added to a newly created customization.

9. The method of claim 1, wherein, if the source element is associated with the globally unique identifier, the modification to the source element is translated into the at least one customization instruction that references the globally unique identifier for the source element.

10. The method of claim 1, wherein if the source element is associated with the locally unique identifier but not the globally unique identifier, the modification to the source element is translated into the at least one customization instruction that references the locally unique identifier for the source element.

11. The method of claim 1, wherein if the source element is not associated with the globally unique identifier or the locally unique identifier, the modification to the source element is translated into the at least one customization instruction that references an XPath expression pointing to the source element.

12. The method of claim 1, wherein the one or more customization instructions are optimized prior to being stored.

13. The method of claim 12, wherein the one or more customization instructions include a first modification instruction to modify a source element and second modification instruction to modify the source element, and wherein the one or more customization instructions are optimized by combining the first and second modification instructions into a single modification instruction.

14. The method of claim 13, wherein the first modification instruction corresponds to a first modification performed during a first runtime session of the software application, and wherein the second modification instruction corresponds to a second modification performed during a second runtime session of the software application.

15. The method of claim 12, wherein the one or more customization instructions include an insert instruction to insert a new element and a modification instruction to modify a portion of a subtree of the new element, and wherein the one or more customization instructions are optimized by combining the insert instruction and the modification instruction into a single insert instruction.

16. The method of claim 12, wherein the one or more customization instructions include an insert instruction to insert a new element and a replace instruction to delete the new element, and wherein the one or more customization instructions are optimized by removing the insert instruction and the replace instruction.

17. The method of claim 12, wherein the first customization is configured to be applied on top of a plurality of additional customizations, wherein a customization instruction in the one or more customization instructions is only applicable to a single customization in the plurality of additional customizations, and wherein the customization instruction is preserved when the one or more customizations are optimized.

18. A system for customizing a software application, the system comprising:

one or more processors;

a memory coupled to the one or more processors;

a first component including a user interface configured to enable creation and/or update of XML documents, wherein a first metadata document is retrieved as a metadata object that is stored in the memory, wherein: the first metadata document is based at least in part on Extensible Markup Language (XML); content of the first metadata document at least partially defines one or more characteristics of at least a portion of a software application; and at least one of the one or more characteristics corresponds to one or more of content, behavior, and/or appearance; and a second component configured to:

receive, from the software component, one or more modifications to the metadata object, wherein: the one or more modifications are expressed as method calls performed on the metadata object; and comprise a modification to a source element in the first metadata document;

translate the one or more method calls into one or more customization instructions, wherein the one or more customization instructions, when executed, cause at least the portion of the software application to change at least one of the one or more characteristics, the translating comprising: checking whether each of a plurality of elements is associated with a respective unique identifier, the plurality of elements comprising a sibling element, a parent element, and the source element; selecting a unique identifier based on a predetermined order comprising determining whether the source element is associated with a globally unique identifier and, if the source element is not associated with the globally unique identifier, determining whether the source element is associated with a locally unique identifier; and generating at least one customization instruction of the one or more customization instructions to reference the modification to the source element based at least in part on the checking and the selecting; and store in a second metadata document the one or more customization instructions as a first customization for the first metadata document, wherein the first customization is stored separately from the first metadata document.

19. A non-transitory machine-readable medium for a computer system, the non-transitory machine-readable medium having stored thereon a series of instructions which, when executed by a processing component, cause the processing component to customize a software application by:

retrieving a first metadata document via a software component configured to enable creation and/or update of XML documents, wherein: the first metadata document is based at least in part on Extensible Markup Language (XML); content of the first metadata document at least partially defines one or more characteristics of at least a portion of a software application; and at least one of the one or more characteristics corresponds to one or more of content, behavior, and/or appearance;

in response to retrieving the first metadata document, creating in memory, a metadata object to represent the first metadata document;

receiving, from the software component, one or more modifications to the metadata object, wherein the one or more modifications: are expressed as method calls performed on the metadata object; and comprise a modification to a source element in the first metadata document;

translating the one or more method calls into one or more customization instructions, wherein the one or more customization instructions, when executed, cause at least the portion of the software application to change at least one of the one or more characteristics, the translating comprising: checking whether each of a plurality of elements is associated with a respective unique identifier, the plurality of elements comprising a sibling element, a parent element, and the source element; selecting a unique identifier based on a predetermined order comprising determining whether the source element is associated with a globally unique identifier and, if the source element is not associated with the globally unique identifier, determining whether the source element is associated with a locally unique identifier; and generating at least one customization instruction of the one or more customization instructions to reference the modification to the source element based at least in part on the checking and the selecting; and storing in a second metadata document the one or more customization instructions as a first customization for the first metadata document, wherein the first customization is stored separately from the first metadata document.

* * * * *

UNITED STATES PATENT AND TRADEMARK OFFICE
CERTIFICATE OF CORRECTION

| | | |
|---|---|---|
| PATENT NO. | : 8,966,465 B2 | Page 1 of 1 |
| APPLICATION NO. | : 12/029615 | |
| DATED | : February 24, 2015 | |
| INVENTOR(S) | : Konduri | |

It is certified that error appears in the above-identified patent and that said Letters Patent is hereby corrected as shown below:

On the title page

On page 3, column 2, item 56 under Other Publications, line 3, delete "Sservices" and insert -- Services --, therefor.

In the claims

In column 26, line 5, in Claim 13, delete "a" and insert -- the --, therefor.

In column 26, line 53, in Claim 18, delete "software" and insert -- first --, therefor.

Signed and Sealed this
Thirteenth Day of October, 2015

Michelle K. Lee
*Director of the United States Patent and Trademark Office*